United States Patent
Kim et al.

(10) Patent No.: US 9,189,142 B2
(45) Date of Patent: Nov. 17, 2015

(54) PORTABLE TERMINAL CAPABLE OF SENSING PROXIMITY TOUCH AND METHOD FOR CONTROLLING SCREEN IN THE SAME

(75) Inventors: Jong Hwan Kim, Seoul (KR); Kwi Suk Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1268 days.

(21) Appl. No.: 12/402,435

(22) Filed: Mar. 11, 2009

(65) Prior Publication Data
US 2009/0237372 A1 Sep. 24, 2009

(30) Foreign Application Priority Data

Mar. 20, 2008 (KR) .................. 10-2008-0025973
May 16, 2008 (KR) .................. 10-2008-0045443

(51) Int. Cl.
- G06F 3/0488 (2013.01)
- G06F 3/0485 (2013.01)
- G06F 3/044 (2006.01)

(52) U.S. Cl.
CPC ............ G06F 3/04855 (2013.01); G06F 3/044 (2013.01); G06F 3/0488 (2013.01)

(58) Field of Classification Search
None
See application file for complete search history.

(56) References Cited

U.S. PATENT DOCUMENTS

| | | | |
|---|---|---|---|
| 6,593,949 B1* | 7/2003 | Chew et al. | 345/157 |
| 8,610,675 B2* | 12/2013 | Lipman et al. | 345/173 |
| 2006/0161871 A1* | 7/2006 | Hotelling et al. | 715/863 |
| 2008/0024454 A1 | 1/2008 | Everest | |
| 2008/0136790 A1* | 6/2008 | Hio | 345/173 |
| 2008/0174570 A1* | 7/2008 | Jobs et al. | 345/173 |
| 2008/0180408 A1* | 7/2008 | Forstall et al. | 345/177 |
| 2008/0288895 A1* | 11/2008 | Hollemans et al. | 715/863 |

FOREIGN PATENT DOCUMENTS

| | | |
|---|---|---|
| CN | 101060676 | 10/2007 |
| EP | 1847917 | 10/2007 |
| JP | 2006-031499 | 2/2006 |
| KR | 10-2004-0083269 | 10/2004 |
| KR | 1020040083269 | 10/2004 |

(Continued)

OTHER PUBLICATIONS

Machine translation of KR10-2007-0052849 into English; Cho.*

(Continued)

*Primary Examiner* — Wayne Young
*Assistant Examiner* — Brian Butcher
(74) *Attorney, Agent, or Firm* — Lee, Hong, Degerman, Kang & Waimey

(57) ABSTRACT

A portable terminal for sensing a touch input, including a direct touch input and a proximity touch input, includes a touch screen configured to receive the touch input via a touching object and responsively displaying at least a first portion of a page and a controller configured to recognize the direct touch input when the touching object contacts the touch screen and recognize the proximity touch input when the touching object is located within a threshold distance relative to the touch screen for a period of time, the proximity touch input being effective as long as the touching object remains within the threshold distance, wherein in response to the proximity touch input, a size of the displayed page is changed from a first size to a second size, or a second portion of the page is displayed on the touch screen, the second portion being different from the first portion.

33 Claims, 35 Drawing Sheets

(56) References Cited

FOREIGN PATENT DOCUMENTS

| | | |
|---|---|---|
| KR | 10-2007-0052849 | 5/2007 |
| WO | 2006003586 | 1/2006 |

OTHER PUBLICATIONS

U.S. Appl. No. 60/918,303, filed Mar. 14, 2007.*

Korean Intellectual Property Office Application Serial No. 10-2008-0025973, Office Action dated Aug. 17, 2009, 4 pages.

Korean Intellectual Property Office Application Serial No. 10-2008-0025973, Office Action dated Dec. 17, 2009, 4 pages.

Korean Intellectual Property Office Application Serial No. 10-2008-0045443, Office Action dated May 30, 2014, 4 pages.

* cited by examiner

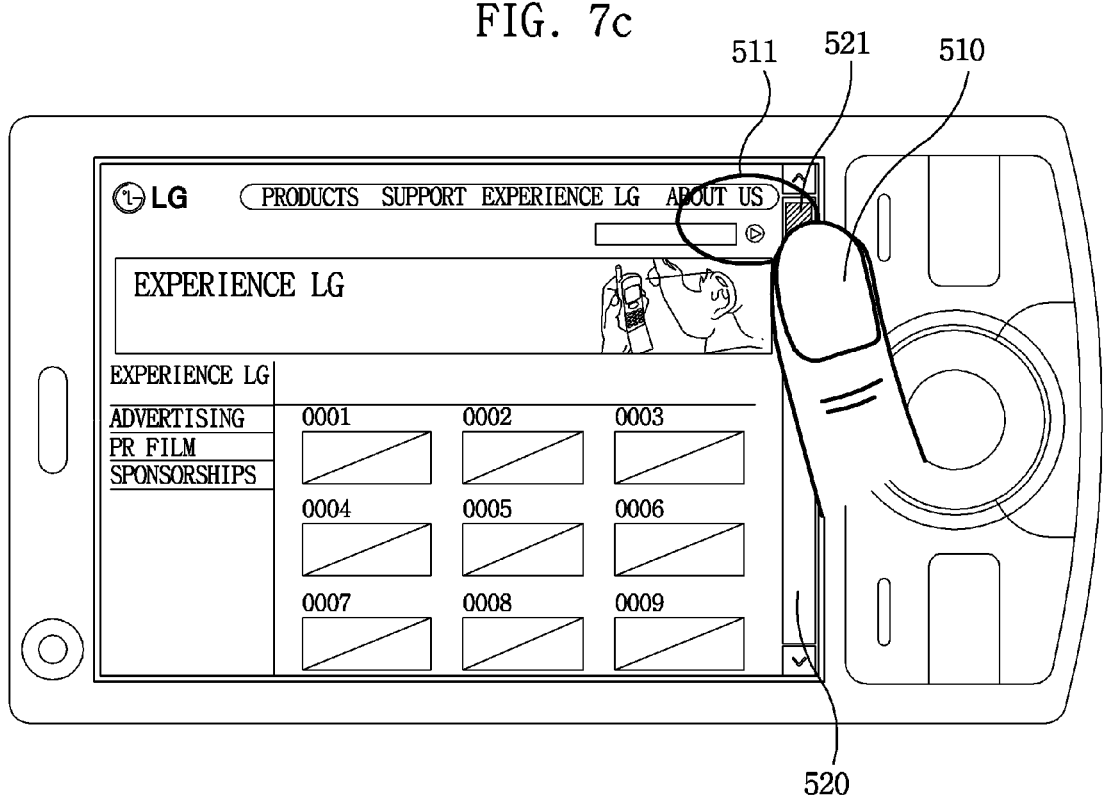
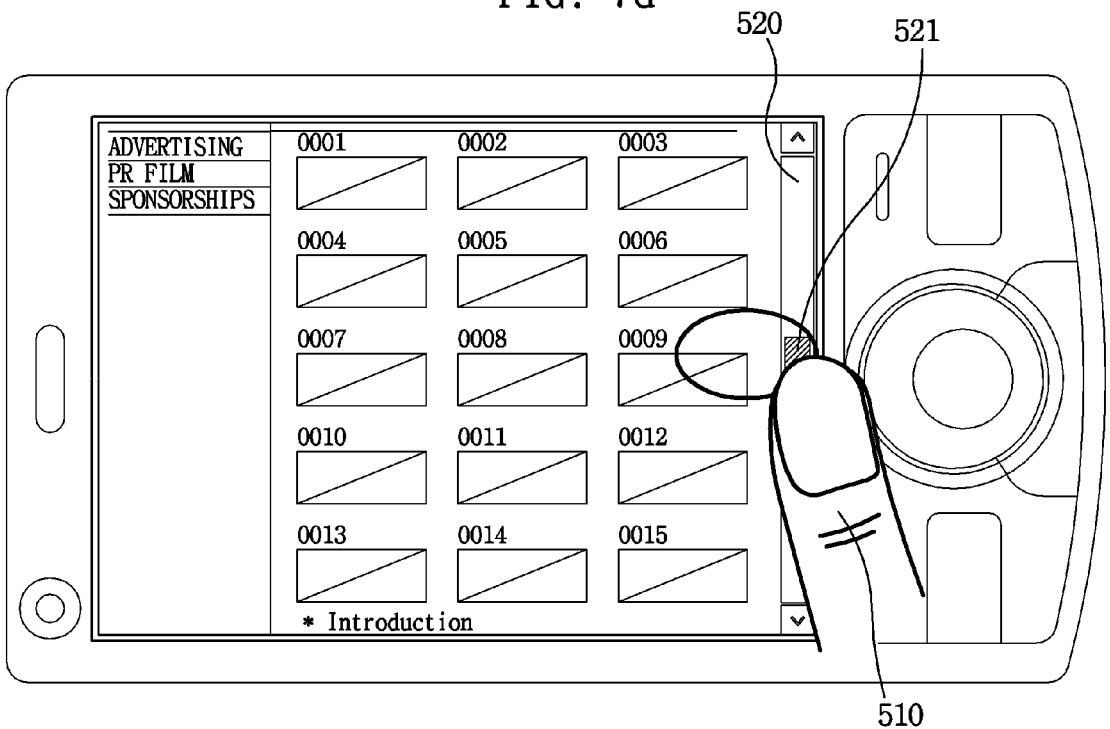

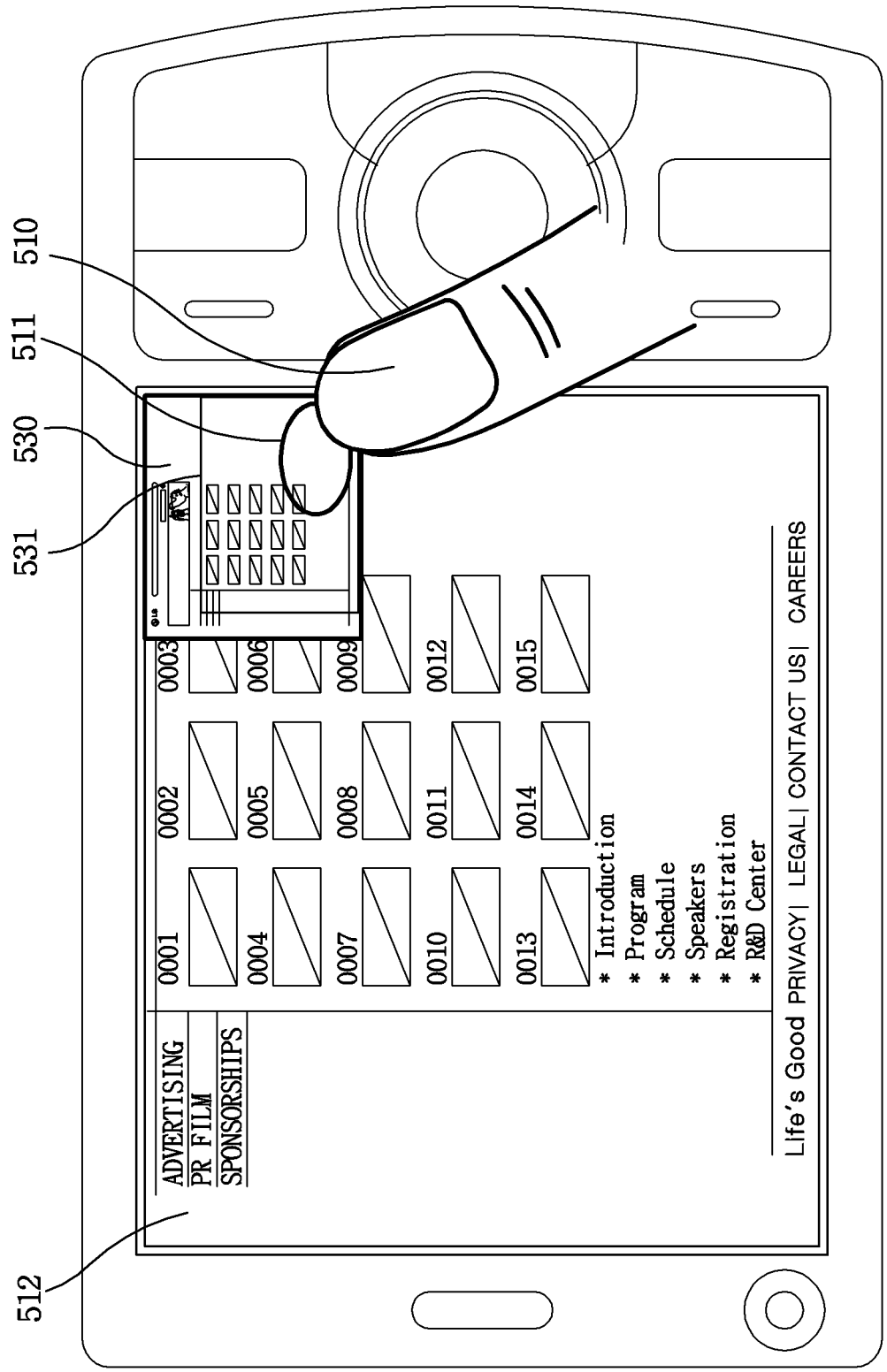

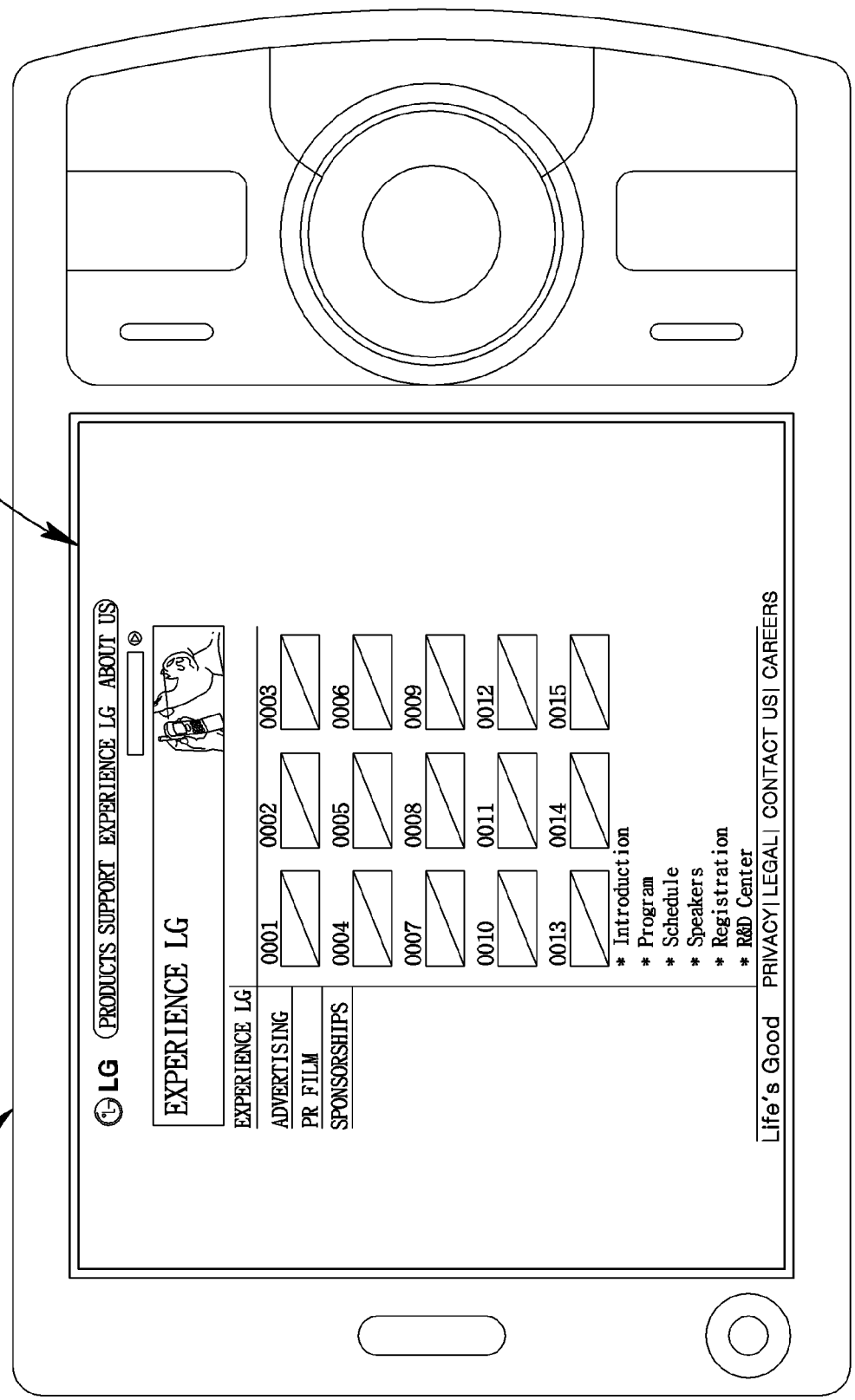

(a)　　　　　　　　　(b)

PORTABLE TERMINAL CAPABLE OF SENSING PROXIMITY TOUCH AND METHOD FOR CONTROLLING SCREEN IN THE SAME

CROSS-REFERENCE TO RELATED APPLICATIONS

Pursuant to 35 U.S.C. §119(a), this application claims the benefit of earlier filing dates and right of priority to Korean Application Numbers 10-2008-0025973, filed Mar. 20, 2008 and 10-2008-0045443, filed May 16, 2008, the contents of which are hereby incorporated by reference herein in their entirety.

FIELD OF THE INVENTION

The present invention relates to a portable terminal capable of sensing proximity touch and a method for controlling a screen in the portable terminal.

DISCUSSION OF THE RELATED ART

Typically, a portable terminal is a mobile device that has one or more functions such as voice and video call communication, data input/output and data storage. With such diverse functions, the portable terminal is evolving into a comprehensive multimedia device that can support various operations, such as capturing images or videos, reproducing music or video files, allowing the user to play games and receiving broadcast contents via the portable terminal.

In order to embody complex functions, hardware and/or software implementations are being developed. For example, a user interface environment is provided in the portable device for the user to search for and select various functions.

SUMMARY OF THE INVENTION

In accordance with an embodiment, a portable terminal for sensing a touch input, including a direct touch input and a proximity touch input, includes a touch screen configured to receive the touch input via a touching object and responsively displaying at least a first portion of a page and a controller configured to recognize the direct touch input when the touching object contacts the touch screen and recognize the proximity touch input when the touching object is located within a threshold distance relative to the touch screen for a period of time, the proximity touch input being effective as long as the touching object remains within the threshold distance, wherein in response to the proximity touch input, a size of the displayed page is changed from a first size to a second size, or a second portion of the page is displayed on the touch screen, the second portion being different from the first portion.

In accordance with an embodiment, a method for controlling display of a page in a portable terminal having a touch screen capable of sensing a touch input, including a direct touch input and a proximity touch input, includes receiving the touch input at the touch screen via a touching object, displaying at least a first portion of the page responsive to the receiving of the touch input, recognizing the touch input as being the direct touch input when the touching object contacts the touch screen, recognizing the touch input as being the proximity touch input when the touching object is located within a threshold distance relative to the touch screen for a period of time, the proximity touch input being effective as long as the touching object remains within the threshold distance, changing a size of the displayed page from a first size to a second size, or displaying a second portion of the page on the touch screen, in response to the proximity touch input, wherein the second portion is different from the first portion.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIGS. 7a-7e are schematic views illustrating controlling a screen in a portable terminal according to an embodiment of the present invention.

FIGS. 11a-11c are schematic views illustrating adjusting a size of a screen in a portable terminal according to an embodiment of the present invention.

FIGS. 12a-12d are schematic views illustrating controlling a screen in a portable terminal according to an embodiment of the present invention.

DETAILED DESCRIPTION OF THE PREFERRED EMBODIMENTS

The portable terminal described in the present disclosure may refer to a mobile phone, a smart phone, a notebook computer, a digital broadcasting terminal, a PDA (Personal Digital Assistance), a PMP (Portable Multimedia Player) and a GPS navigation device and the like. Recently, a portable terminal with a touch screen coupled with a touch pad attached to a display module has been realized to provide various user interface environments. A user is now able to input various user commands or selects functions while watching a screen image embodied on the display module.

However, the portable terminal using the conventional touch screen suffers from shortcomings in that various user interface environments cannot be provided, because a user is only allowed to select a function related to a menu or an icon by touching, with a finger or pointer, the menu or the icon displayed on a screen of the portable terminal. Recently, with widespread use and development of the Internet technology as a background, a screen image of a web page can be executed on a portable terminal in the same manner as that in the personal computer, and the portable terminal can provide a full browsing service capable of retrieving contents of all wired websites.

Despite the fact that contents relative to websites can be retrieved by a portable terminal, a display module of the portable terminal is generally too small to display texts, graphics, images, moving images and flash applications included in the web page, thereby posing the following problems. For example, it is very difficult for a user to recognize desired contents with the naked eye, as the small-sized display module of the portable terminal is overcrowded with texts, graphics, images, moving images and flash applications included in the web page.

Another drawback presented by the situation is that when a user utilizes the touch screen to select a particular image on a web page and then to retrieve another web page linked to the particular image, other images or texts adjacent to the particular image may be unintentionally touched because the size of the particular image is smaller than a contact area between a user's finger or a pointer and the touch screen. In this case, the user may be connected to arbitrary web pages rather than desired web pages intended to retrieve information through the wireless Internet.

According to embodiments of the present invention, a portable terminal capable of sensing a proximity touch and a method for controlling a screen on the same will be described in detail with reference to the accompanying drawings.

Figure 1:
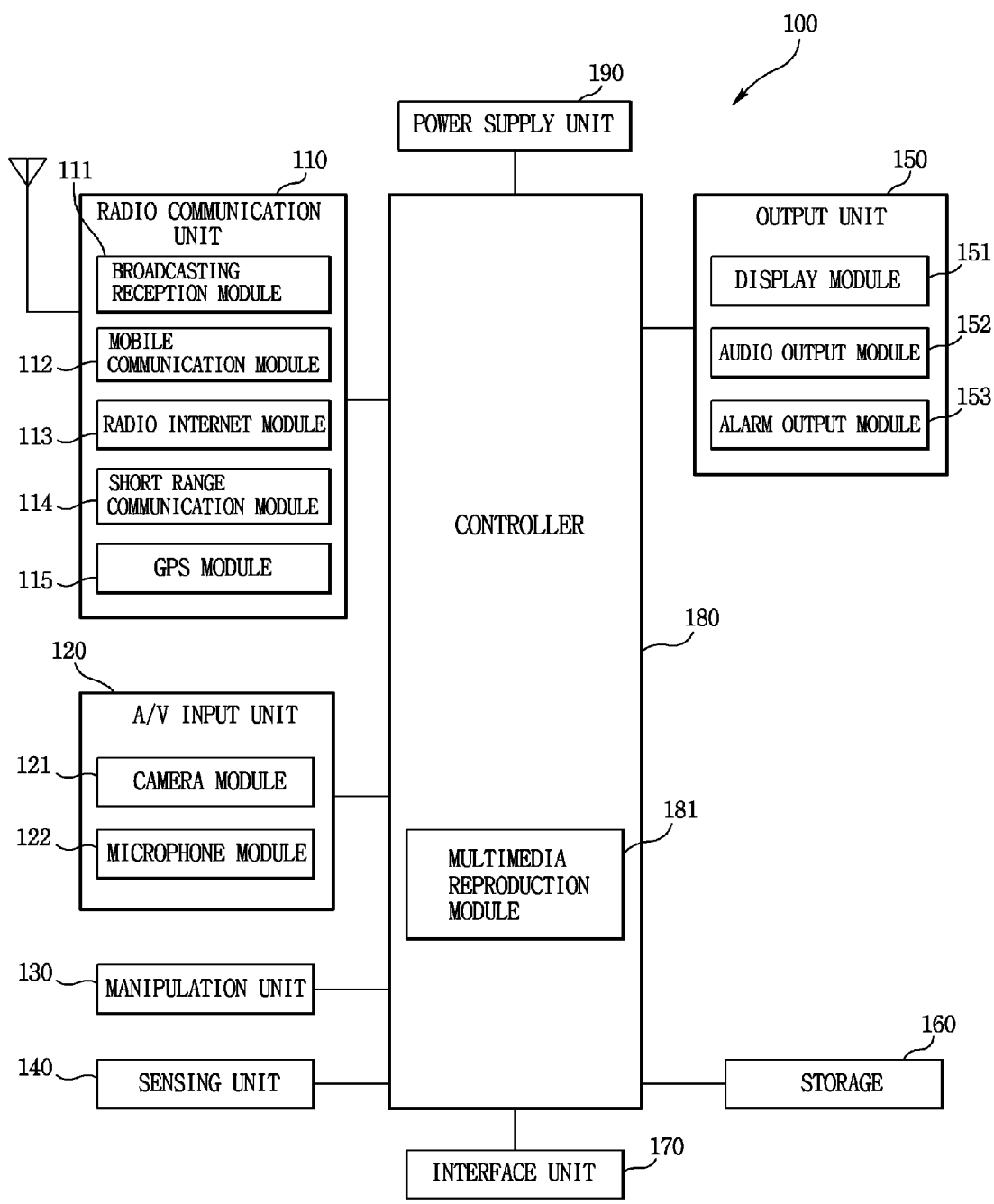
FIG. 1 is a block diagram of a portable terminal according to an embodiment of the present invention.

Referring to FIG. 1, according to an embodiment of the present invention, the portable terminal 100 includes a radio communication unit 110, an A/V (audio/Video) input unit 120, a manipulation unit 130, a sensing unit 140, an output unit 150, storage 160, an interface unit 170, a controller 180, a power supply unit 190, as well as other elements. It should be noted that two or more elements may be combined in a single element, or a single element may be divided into two or more elements in various embodiments.

The radio communication unit 110 may include a broadcasting reception module 111, a mobile communication module 112, a radio (wireless) Internet module 113, a short-range communication module 114 and a GPS module 115. The broadcasting reception module 111 receives broadcasting signal and/or broadcasting related information from an external broadcasting management server via a broadcasting channel. The broadcasting channel may include a satellite channel or a terrestrial channel or some other type of communication channel. The broadcasting management server may refer to a server that generates and transmits broadcasting signals and/or broadcasting associated information or a server that receives previously generated broadcasting signals and/or broadcasting associated information and transmits such to a terminal. The broadcasting associated information may refer to information related to a broadcasting channel, a broadcasting program or a broadcasting service provider. The broadcasting signal may include not only a TV broadcasting signal, a radio broadcasting signal, or a data broadcasting signal, but also a broadcasting signal obtained by combining a data broadcasting signal with a TV broadcasting signal or a radio broadcasting signal.

Meanwhile, the broadcasting associated signal may be provided via a mobile communication network, and in such a case, such information may be received by the mobile communication module 112. The broadcasting associated information may be implemented in various formats. For example, the broadcasting associated information may include an EPG (Electronic Program Guide) of a DMB (Digital Multimedia Broadcasting) format, or an ESG (Electronic Service Guide) of a DVB-H (Digital Video Broadcasting-Handheld) format.

The broadcasting reception module 111 receives broadcasting signals by using various digital broadcasting techniques, and particularly, the digital broadcasting signals can be received by using digital broadcasting techniques, such as DMB-T (Digital Multimedia Broadcasting-Terrestrial), DMB-T (Digital Multimedia Broadcasting-Satellite), Media-FLO (Media Forward Link Only), DVB-H (Digital Video Broadcasting-Handheld) and ISDB-T (Integrated Services Digital Broadcasting-Terrestrial). It should be also noted that the broadcasting reception module 111 may be configured to be suitable for any other broadcasting technique that provides broadcasting signals and information. The broadcasting signals and/or broadcasting associated information received via the broadcasting reception module 111 may be stored in the storage 160.

The mobile communication module 112 transmits and receives radio signals to and from at least one device out of a base station, an external terminal and a server of a mobile communication network. The radio signals may include voice call signals, video (or conference) communication call signals, data in various formats based on the transmission and reception techniques used, text/multimedia messages and other types of information.

The radio internet module 113 refers to a module that supports a radio access to a network such as Internet, and may be installed in the mobile terminal or may be implemented as an internal or external element. The short range communication module 114 refers to a module that supports short range communications. Suitable technologies for implementing this module may include Bluetooth, RFID (Radio Frequency Identification), IrDA (Infrared Data Association), UWB (Ultra Wideband) and ZigBee. The GPS module 115 receives navigational information from a plurality of satellites.

The A/V input unit 120 is configured to receive audio signals or video signals and may include a camera module 121 and a microphone module 122. The camera module 121 functions to process image frames such as motionless images or videos (moving images) that are obtained by an image sensor in a video call (or video conference) mode or in an image capture mode. The processed image frames may then be displayed on a display module 151. The image frames processed by the camera module 121 may be stored in the storage 160 or transmitted to outside via the radio communication unit 110. Two or more camera modules 121 may be provided according to configuration and aspects of the portable terminal.

The microphone module 122 receives an external sound signals from a microphone in a calling mode, a recording mode or a voice recognition mode and processes such into an electrical audio (voice) data. The processed audio data may be converted for output into a format that can be transmittable to a mobile communication base station via the mobile communication module 112 in a calling mode. The microphone module 122 may include various types of noise canceling algorithms (or other processing mechanisms) to cancel noise generated in the course of receiving the external audio signals.

The manipulation unit 130 may generate key input data based on user inputs to control the operation of the portable terminal. The manipulation unit 130 may be formed as a key pad, a dome switch, a touch pad (e.g., employing touch recognition techniques based on pressure, capacitance, resistance and the like), a jog wheel and a jog dial switch. Particularly, when the touch pad is combined with the display module 151 in a layered structural manner, such may be called a touch screen.

The sensing unit 140 senses a current state (or configuration) of the portable terminal (i.e., an opened or closed state), a location (or orientation) of the portable terminal 100, or whether the user has touched certain portion of the portable terminal. Based on such sensing, a sensing signal for controlling the operation of the portable terminal 100 is generated.

For example, if the portable terminal 100 is a slide-type portable terminal, the sensing unit 140 can sense whether a slide portion of the slide type portable terminal is opened or closed with respect to a main body portion of the portable terminal. In addition, the sensing unit 140 can perform a sensing function to detect whether the power supply unit 190 has supplied power or whether the interface unit 170 is connected with an external device.

The interface unit 170 functions to interface with various external devices that can be connected with the portable terminal 100. For example, the external devices may include a wired or wireless headset, an external charger, a wired or wireless data port, a card socket (i.e., for coupling a memory card and a SIM/UIM card), an audio input/output port, a video input/output port, and an earphone. The interface unit 170 may be used to receive data from the external device or be provided with power, such that the received data or power can be delivered to particular elements of the portable terminal 100 or may be used to transmit data and other information from the portable terminal 100 to the external device.

The output unit 150 is configured to provide various types of outputs such as audio signal, a video signal or an alarm signal and may include a display module 151, an audio output module 152 and an alarm output module 153.

The display module 151 serves to output and display information processed by the portable terminal 100. For example, the display module 151 may display a particular UI (User Interface) or GUI (Graphic User Interface) related to the call operation when the portable terminal 100 is in a calling mode. The display module 151 may display a captured and/or received image, or a particular UI and/or GUI when the portable terminal 100 is in a video calling mode or an image capturing mode.

As noted above, if the display module 151 and the touch pad are formed together in a layered manner to constitute a touch screen, the display module 151 may be used as an input device as well as an output device. The display module 151 may include at least one of a liquid crystal display (LCD), a thin film transistor-liquid crystal display, an organic light emitting diode (LED), a flexible display and a three-dimensional (3D) display. The display module 151 may include two or more such displays according to particular implementation of the portable terminal 100. For example, the portable terminal 100 may be disposed with external display module and internal display modules at the same time.

The audio output module 152 may output audio data that has been received from the radio communication unit 110 in a call signal reception mode, a calling mode, a recording mode, a voice recognition mode or a broadcasting reception mode, or output audio data which has been stored in the storage 160. In addition, the audio output module 152 may output an audio signal related to a function (e.g., a call signal reception sound and a message reception sound) performed by the portable terminal 100. The audio output module 152 may include a speaker and a buzzer.

The alarm output module 153 may output a signal that informs an event of the portable terminal 100. The event occurring in the portable terminal 100 may be, for example, a call signal reception requesting a telephone call, a message reception, a key signal input and an alarm that informs a preset time. The alarm output module 153 outputs a signal informing about occurrence of an event in a different format other than an audio signal or a video signal. The alarm unit 153 may output a signal, for example, in the form of vibration. When a call signal or a message is received, the alarm output module 153 may output vibration in order to inform about the received call signal or message. Alternatively, when a key signal is received, the alarm unit 153 may output vibrations as a feedback of the inputted key signal. The user can recognize the occurrence of an event via the vibrations. Additionally or alternatively, the occurrence of an event may be informed to the user via the display module 151 and/or the audio output module 152.

The storage 160 may store software programs (or codes, instructions, and the like) used to support the processing and controlling performed by the controller 180 and may perform a function for temporarily storing inputted or outputted data, such as a phone book, a message, a still image, video or the like. The storage 160 may include a storage medium of at least one of a flash type memory, a hard disk type memory, a multimedia card, a card type memory (e.g., SD card, XD card, etc.), a RAM and a ROM, just to name a few. In addition, the portable terminal 100 may cooperate with a network storage device capable of performing the storage function of the storage 160 via network access such as the Internet.

The controller 180 controls the general operations of the portable terminal 100. For example, the controller 180 performs the controlling and processing associated with handling a voice call, data communication, a video call. In addition, the controller 180 may include a multimedia reproduction module 181 for reproducing multimedia data. The multimedia reproduction module 181 may be formed as a hardware component within the controller 180 or may be formed as a software component separately from the controller 180.

The controller 180 may identify a proximity touch or a direct touch of the touch screen by an object, such as a finger or a pointer, to change the size or area of a screen displayed on the touch screen. To this end, the controller 180 may be formed with a scroll bar or a mini map for controlling the size or area of a screen displayed on the touch screen.

The power supply 190 receives external power or internal power and supplies the power required for the operation of various elements under the control of the controller 180.

In the above description, the portable terminal 100 according to an embodiment of the present invention has been explained in terms of elements from the perspective of their functions. Hereinafter, the portable terminal 100 will be explained in terms of the external elements with reference to FIGS. 2 and 3. For simplicity, a touch screen-type portable terminal among various types of portable terminals such as a folder type, a bar type, a swing type and a slider type will be referred to for explaining the exemplary implementations. However, it can be clearly understood that the features described herein are not limited to the touch screen-type portable terminal, but can be applicable to any type of portable terminal.

Figure 2:
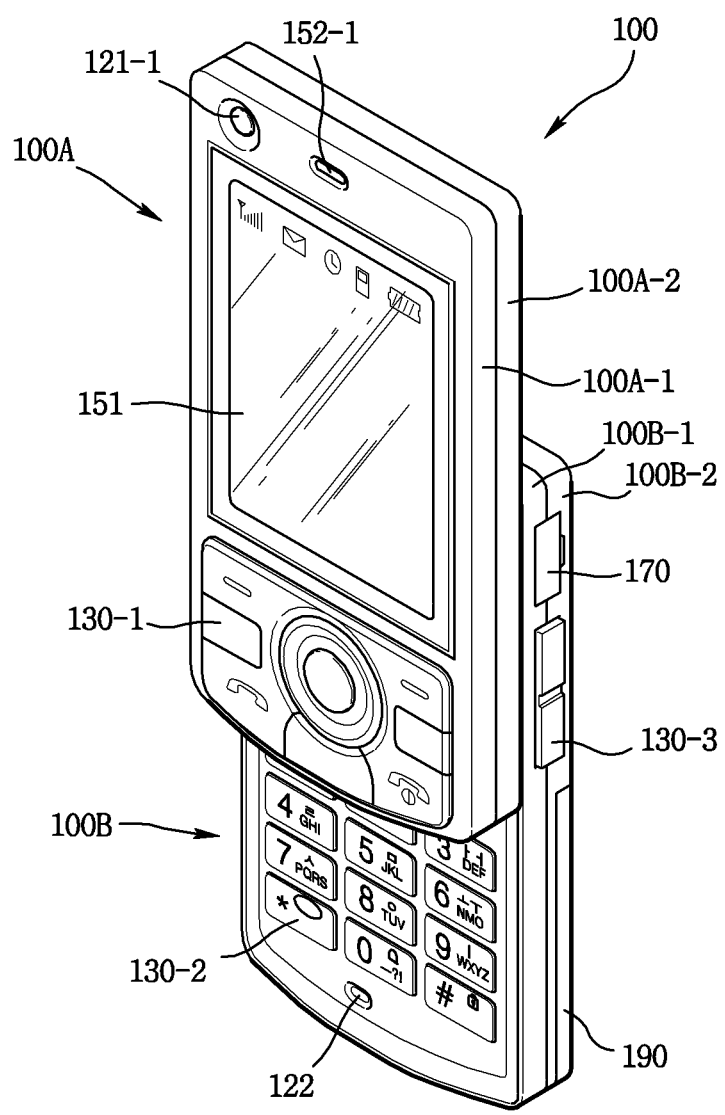
FIG. 2 is a front perspective view of a portable terminal according to an embodiment of the present invention.

Referring to FIG. 2, the portable terminal 100 includes a first body 100A and a second body 100B formed to be slidably moving along at least one direction on the first body 100A. A state in which the first body 100A is disposed to overlap with the second body 100B may be called a closed configuration, and as shown in FIG. 2, a state in which the first body 100A is moved to expose at least a portion of the second body 100B may be called an open configuration.

In the closed configuration, the portable terminal 100 operates mainly in a standby mode, and the standby mode may be released according to a user manipulation. In the open configuration, the portable terminal 100 operates mainly in the calling mode, and the operation state may be changed into the standby mode upon lapse of a certain time or according to user manipulation.

The case (a casing, a housing, a cover and the like) constituting an external appearance of the first body 100A consists of a first front case 100A-1 and a first rear case 100A-2, and various electronic components are installed in a space therebetween. At least one or more intermediate cases may be additionally disposed between the first front case 100A-1 and the first rear case 100A-2. The cases may be formed by injection-molding of a synthetic resin or may be made of a metallic material, such as stainless steel (STS) or titanium (Ti).

On the first body 100A, substantially on the first front case 100A-1, the display module 151, the first audio output module 152-1, the first camera module 121-1 or a first manipulation unit 130-1 may be disposed. The display module 151 may be an LCD (Liquid Crystal Display), an OLED (Organic Light Emitting Diode), or the like that visually displays information. A touch pad may be overlaid (overlapped, superimposed, or covered) on the display module 151 in a layered manner to allow the display module 151 to operate as a touch screen, whereby the user may input information or commands by touching the display module 151.

The first audio output module 152-1 may be implemented as a receiver or a speaker to output various types of sounds. The first camera module 121-1 may be suitably implemented for capturing still images, moving images, videos, or other visual information. The microphone module 122 may be suitably implemented for receiving a voice of the user or other sounds.

The manipulation unit 130-1 receives user commands for controlling network contents reproduction and travel guide operations. Like the first body 100A, the case constituting the external appearance of the second body 100B includes a second front case 100B-1 and a second rear case 100B-2. A second manipulation unit 130-2 may be disposed on the second body 100B, specifically, on a front face portion of the second front case 100B-1. A third manipulation unit 130-2, a microphone module 122, and an interface unit 170 may be disposed on at least one of the second front case 100B-1 or the second rear case 100B-2.

The first to third manipulation units 130-1, 130-2, 130-3 may be collectively referred to as the manipulation unit 130, and any means can be employed as the first to third manipulation 130-1, 130-2, 130-3 so long as it can be operated in a tactile manner. For example, the manipulation unit 130 may be implemented by using one or more dome switches or touch pads that can receive a user command or information according to press or touch operation by the user, or may be implemented by using a mechanical manipulation means, such as a rotatable element (e.g., a wheel, dial, jog button, thumbwheel, or the like) or a linear movement element (e.g., a joystick, lever, knob, or the like).

In terms of functions thereof, the first manipulation unit 130-1 may comprise one or more function keys used for inputting a command such as start, end or scroll, and the second user input unit 130-2 may comprise one or more keypads used for inputting numbers, characters, and symbols. The third manipulation unit 130-3 may be operated as a so-called hot key for activating a special function of the portable terminal 100.

The interface unit 170 may be used as a passage (path or link) that allows data to be exchanged with an external device through a wired or wireless medium. For example, the interface unit 170 may be at least one of a connection port used for connection of an ear jack, earphones, and the like, a communication port that supports short-range communications (e.g., an IrDA port, a Bluetooth port, a wireless LAN port, and the like), and a power supply port used for supplying power to the portable terminal 100. The interface unit 170 may include a card socket for receiving or accommodating a card-like medium, such as a SIM (Subscriber Identification Module) card, a UIM (User Identity Module) card and a memory card for storing information.

The power supply unit 190 may be mounted at the side or edge portion of the second rear case 100B-2 for use in supplying power to the portable terminal 100. The power supply unit 190 may be a rechargeable battery, which can be releasably and attachably formed with the portable terminal 100.

Figure 3:
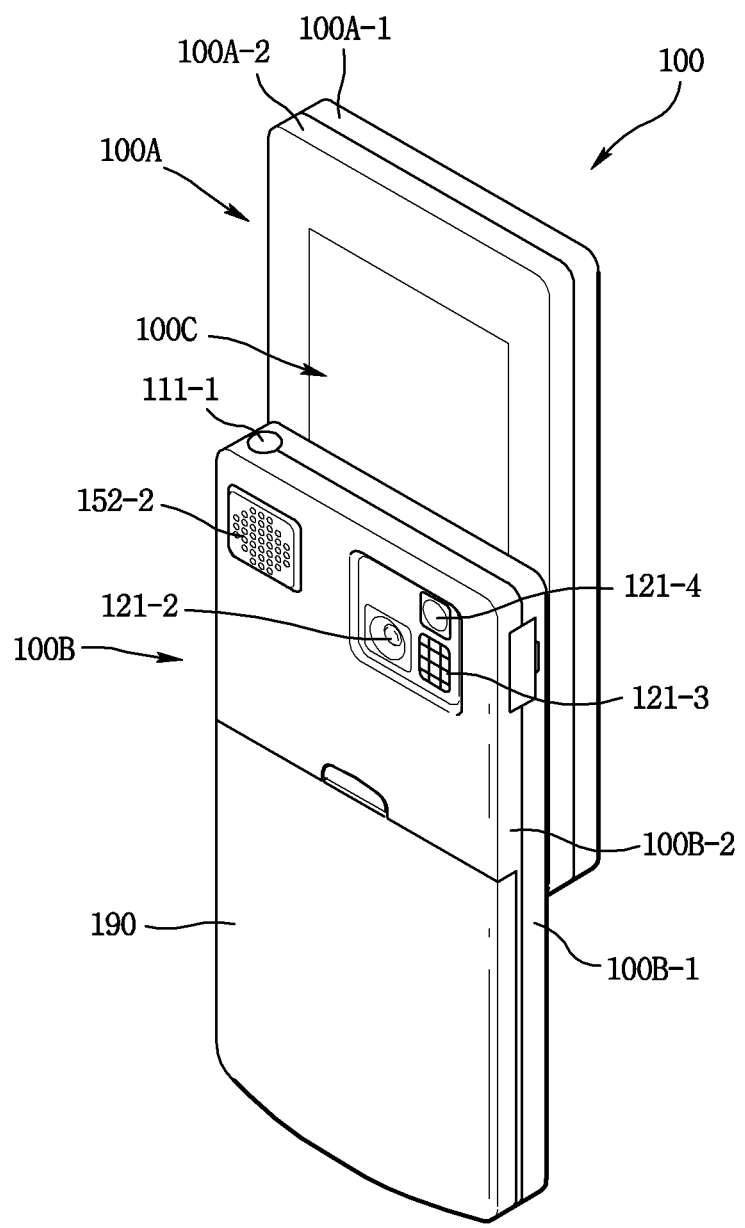
FIG. 3 is a rear perspective view of the portable terminal shown in FIG. 2.

Referring to FIG. 3, a second camera module 121-2 may be additionally mounted on the rear surface of the second rear case 100B-2 of the second body 100B. The second camera module 121-2 may have an image capture direction which is substantially opposite to that of the first camera module 121-1 shown in FIG. 1, and may support a different image resolution compared to the first camera module 121-1.

For example, the first camera module 121-1 is used for low resolution (i.e., supporting a relatively small number of pixels) to quickly capture an image or video of the user's face for immediate transmission to another party during video conferencing or the like, while the second camera module 121-2 is used for high resolution (i.e., supporting a relatively large number of pixels) in order to capture more detailed (higher quality) images or video which typically do not need to be transmitted immediately.

A flash 121-3 and a mirror 121-4 may be adjacently disposed at the second camera module 121-2. When an image of a subject is captured by the second camera module 121-2, the flash 150 illuminates the subject. The mirror 121-4 allows the user to see himself or herself when he or she wants to capture his or her own image (i.e. perform self-image capturing) by using the second camera module 121-2.

A second audio output module 152-2 may be additionally disposed on the second rear case 100B-2, and may implement a stereophonic function in conjunction with the first audio output module 152-1 shown in FIG. 2, and may be also used in a speaker phone mode for call communication. A broadcasting signal reception antenna 111-1 may be disposed at one side of the second rear case 100B-2, in addition to an antenna used for call communication. The antenna 111-1 may be installed such that it can be extended from the second body 100B.

One part of a slide module 100C that slidably connects the first body 100A with the second body 100B may be disposed on the first rear case 100A-2 of the first body 100A. The other part of the slide module 100C may be disposed on the second front case 100B-1 of the second body 100B, which may not be exposed to the outside as shown in FIG. 3.

In the above description, the second camera module 121-2 and the like are disposed on the second body 100B, but such exemplary configuration is not meant to be limiting. For example, one or more of the elements 111-1, 121-2, 121-3, 152-2 which are disposed on the second rear case 100B-2 may be mounted on the first body 100A, mainly, on the first rear case 100A-2. In this case, there is an advantage in that those elements disposed on the first rear case 100A-2 can be protectively covered by the second body 100B in the closed configuration. In addition, even if a second camera module 121-2 is not separately mounted, the first camera module 121-1 may be configured to rotate to thereby enable an image capturing up to an image capturing direction of the second camera module 121-2.

The above described portable terminal 100 is not limited to configurations and methods of the implementations disclosed herein. An entire or part of each implementation may be selectively and structurally combined to implement the present disclosure in diverse forms.

Figure 4:
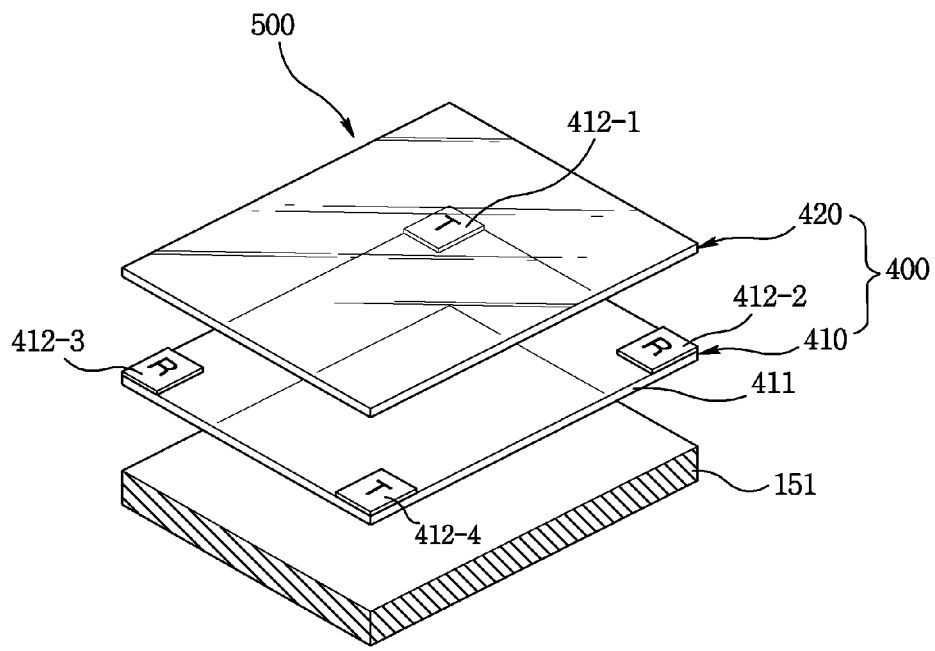
FIG. 4 is a schematic view illustrating a structure of a touch screen according to an embodiment of the present invention.

Referring to FIG. 4, the display module 151 may be overlaid (overlapped, superimposed, or covered) on the touch pad 400 in a layered manner to allow operating as a touch screen. The touch pad 400 illustrated in FIG. 4 is comprised of a squared conduction film 411 made of transparent conductive material such as ITO (Indium Tin Oxide) and metal electrodes 412-1 to 412-4 each formed at edge of each conductive film 411. The conductive film 411 may be formed thereon with a protective film 420.

The touch pad 400 is a position detection device of capacitive sensing type and formed with electric field lines between transmission side metal electrodes (T: 412-1, 412-4) and reception side metal electrodes (R: 412-2, 412-3) by an AC (alternating current) voltage applied to the transmission side metal electrodes (T: 412-1, 412-4). The formed electric field lines are extended to the outside of the touch pad 400 via the protective film 420.

As a result, when an object, for example, digits of a user, comes near to the touch pad 400 or directly touches the touch pad 400, the electric field lines are partially interrupted to generate a change in the phase and size of the current flowing to the reception side metal electrodes (R: 412-2, 412-3). This is because the human body has a static capacity of several pFs relative to ground to distort the electric field lines formed on the touch pad 400 when a user brings a finger near to or touches the touch pad 400.

Processors formed inside the portable terminal 100 may use the current change of the reception side metal electrodes (R: 412-2, 412-3) in response to the touch operation of the object to detect a distance neared by the object and a position where the touch has occurred. In addition, the object may include not only the fingers of the user, but also all the objects capable of identifying the touch input by the portable terminal 100, by distorting the electric field lines formed on the touch pad 400.

Figure 5:
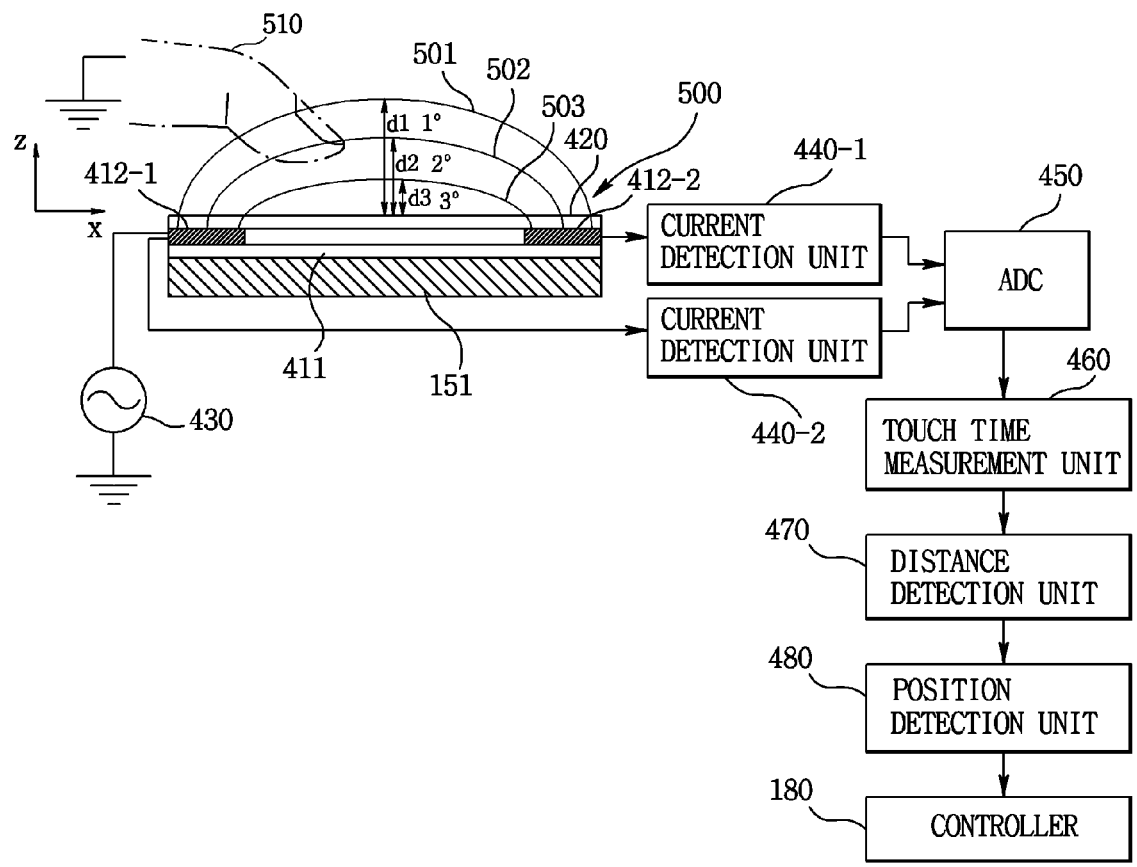
FIG. 5 is a schematic view illustrating detecting a proximity distance of an object on the touch screen shown in FIG. 4.

Referring to FIG. 5, application of AC voltage 430 to the transmission side metal electrode 412-1 out of metal electrodes 412-1 to 412-4 formed on the transparent conductive film 411 makes it possible to form electric field lines 501 to 503 between the transmission side metal electrode 412-1 and the reception side metal electrode 412-2. The electric field lines 501 to 503 may be extensively formed in a vertical upward direction (i.e., z direction) of the touch screen 500.

The amount of the electric field lines 501 to 503 interrupted by a finger 510 may be changed based on the proximity distance to the touch screen 500 neared by the finger 510 of the user. In other words, as the finger 510 nears the touch screen 500, the level of interruption applied to the electric field lines 501 to 503 increases.

As noted above, the interruption applied to the electric field lines 501 to 503 by the finger 510 changes the current applied to current detection units 440-1, 440-2 connected to the metal electrodes 412-1, 412-2, where the current detection units 440-1, 440-2 detect the changed current and provide the change to an ADC (Analog-to-Digital Converter 450). The ADC 450 converts the current amount inputted in the form of the analog signal to a digital value and provides the digital value to a touch time measurement unit 460.

The touch time measurement unit 460 measures a time for which the finger 510 stayed within a touch recognition effective distance (for example, 'd1' of FIG. 5) capable of identifying proximity of the finger 510 by the touch screen 500 based upon the information regarding the changed current amount provided by the ADC 450. In doing so, the touch time measurement unit 460 may recognize that the proximity touch or direct touch operation is being performed if the finger 510 stays longer than a predetermined time (for example, 1 second) within the proximity touch recognition effective distance (for example, 'd1' of FIG. 5). If the finger 510 stays shorter than the predetermined time within the proximity touch recognition effective distance, the touch time measurement unit 460 may determine that the proximity touch or direct touch operation is not being performed.

If it is determined that there is a touch input in response to the proximity touch or direct touch operation relative to the touch screen 500, the touch time measurement unit 460 may provide to a distance detection unit 470 information on touch input generation information and current change amount. The distance detection unit 470 may calculate a distance between the finger 510 and the touch screen 500, i.e., a distance separated from the touch screen 500 by the finger 510 in the vertical upward direction (i.e., z direction) based upon the information on the provided current change amount.

If the finger 510 is positioned within a first area (1°) that is between the electric field lines 501 and 502 (for example, between 20 and 30 mm in distance from the touch pad 400 in z direction), the distance detection unit 470 may determine that the finger 510 has entered the touch recognition effective distance to detect whether the touch screen 500 starts to be touched by an external object, and may provide a function corresponding to the proximity touch operation. The proximity touch is defined by a state of an object, such as a finger of a user, being positioned within the touch recognition effective distance of the touch screen 500 for inputting a user command. The proximity touch of the object not directly touching the touch screen 500 may be distinguished from the direct touch operation that directly touches the touch screen 500 by the object.

Furthermore, if the finger 510 is positioned within a second area (2°) that is between the electric field lines 502 and 503 (for example, between 10 and 20 mm in distance from the touch pad 400 in z direction), the distance detection unit 470 may determine that the finger 510 has approached closer to the touch screen 500 compared to the first area (1°). If the finger 510 is positioned within a third area (3°) that is between the electrical field line 503 and the surface of the touch screen 500 (for example, within 10 mm in distance from the touch pad 400 in z direction or d3) or the finger 510 has directly touched the surface of the touch screen 500, the distance detection unit 470 may determine that the finger 510 has directly touched the touch screen 500 within the error range.

Although the touch operation by the finger 510 has been described with three steps or areas according to the distance between the finger 510 and the touch screen 500, the touch operation may include more than three steps or areas for more detailed accuracy. Subsequently, a position detection unit 480 may calculate a position on the touch screen 500 indicated by the finger 510 or a horizontal coordinate of x and y direction on the touch screen 500 based upon information on the changed current amount. The y direction is a vertical direction of the x-y plane and is illustrated in FIG. 5. The two directions are shown normal to the x-y plane.

The measured vertical distance between the finger 510 and the touch screen 500 and the horizontal coordinate of the finger 510 on the touch pad 400 may be transmitted to the controller 180. In response, the controller 180 may check the user command according to the vertical distance and the horizontal coordinate to perform a control operation in response to the user command and provide a predetermined graphic user interface (GUI)

Figure 6:
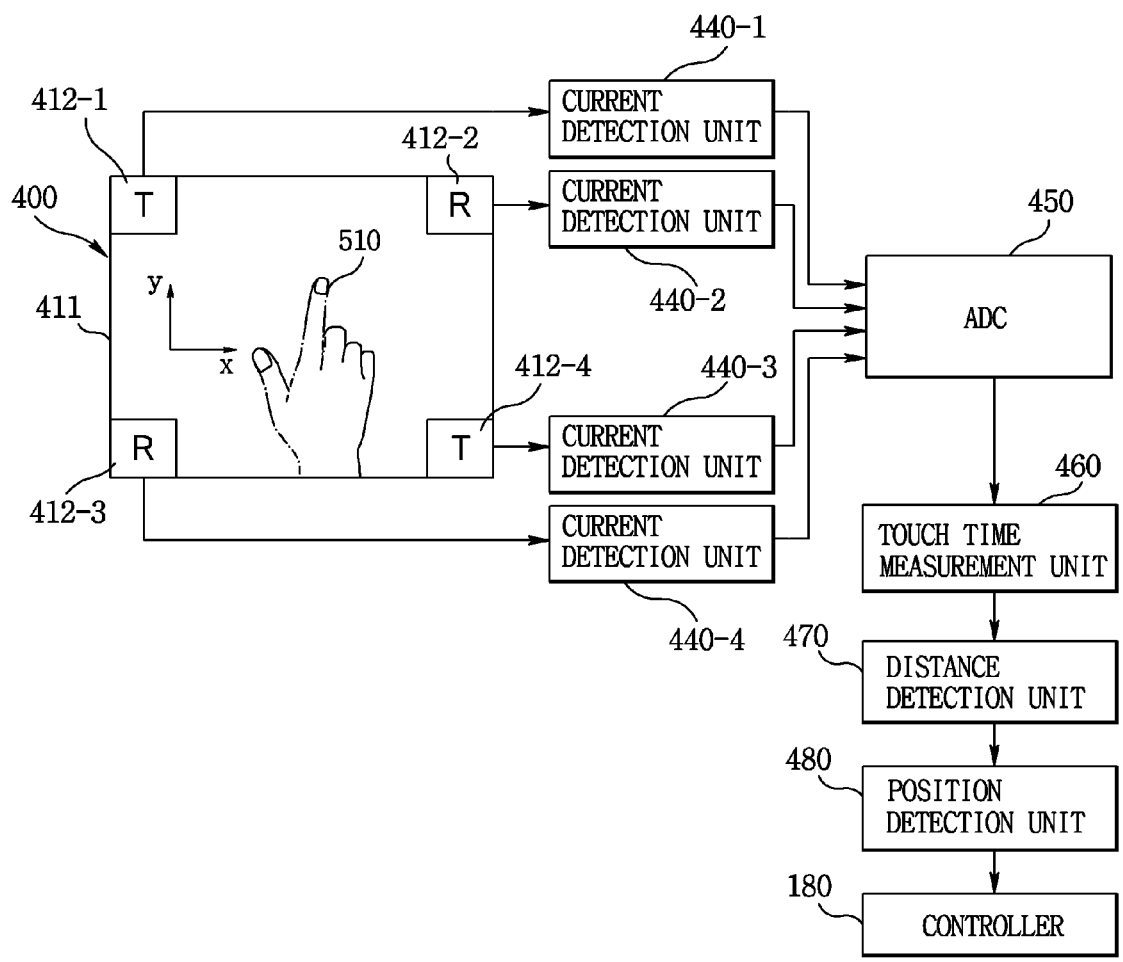
FIG. 6 is a schematic view illustrating detecting a position of an object on the touch screen shown in FIG. 4.

Referring to FIG. 6, when an AC voltage is applied from the AC voltage source to the transmission side metal electrodes 412-1, 412-4 of the touch panel 400, electric field lines are formed between transmission side metal electrodes 412-1, 412-4 and the reception side metal electrode 412-2, 412-3 as shown in FIG. 5. If the finger 510 comes near to the touch panel 400 or directly touches the touch panel 400, current changes are generated in the metal electrodes 412-1 to 412-4. The current detection units 440-1 to 440-4 measure the current changes, and as described above, the position detection unit 480 detects the horizontal coordinate (i.e., x-y coordinate) located on the touch panel 400 by the finger 510 via the current changes and provides the coordinate to the controller 180. The controller 180 may recognize the horizontal coordinate on the touch screen 500 touched by the finger 510 to perform the user command corresponding to the touch operation and provide the predetermined graphic user interface (GUI) onto the display module 151.

Although the touch time measurement unit 460, the distance detection unit 470 and the position detection unit 480 were separately described in FIGS. 5 and 6 according to their functions, these units 460, 470, 480 may be formed inside the controller 180. Further, although the touch screen 500 equipped with the touch panel 400 according to capacitance detection type has been exemplified in FIGS. 4, 5 and 6 to explain the principle of determining the proximity touch and direct touch of input medium relative to the touch screen 500, arrangement shapes of the metal electrodes 412-1 to 412-4 of the touch panel 400 or the kinds of touch panel 400 are not limited thereto as long as the function is provided for detecting the position entered by the input medium such as a finger and the distance between the input medium and the touch screen 500.

For example, the touch panel 400 may be embodied to detect a proximity position between the input medium and the touch panel 400 using a photoelectric sensor that uses laser diodes and light emitting diodes, a high frequency oscillation proximity sensor and electromagnetic proximity sensor. The touch panel 400 may also be embodied by combining the capacitance detection type and the resistive sensing type by forming metal electrodes on an upper plate or a lower plate for detecting voltage changes according to a position pressed by the input medium.

Referring to FIGS. 7a-7e, the touch pad 400 of the portable terminal 100 may be overlaid on the display module 151 in a layered manner to allow the display module 151 to operate as a touch screen, whereby the user may input a user command through the screen while viewing the screen. Particularly, the touch screen 500 can distinguish proximity touch input and direct touch input generated by an object, such as a finger of a user, whereby different input signals may be generated in response to the proximity touch input and the direct touch input. Therefore, the user may use the finger 510 to input different user commands proximately touching or directly touching the touch screen 500.

The portable terminal 100 according to an embodiment of the present invention may access a web site via a radio Internet module 113 and the web page of the accessed web site may be displayed on the touch screen 500. The web page may include, for example, a corporate logo, a menu bar, an advertisement, an image, a text and a graphic. Areas indicated as "0001 to 00015" in the web page may include various texts, graphics, images and advertisements. Furthermore, the corporate logo, the menu bar, the advertisement, the image, the text and the graphic included in the web page may be linked to their respective URLs (Uniform Resource Locators) of different web pages such that the user may display a screen of corresponding web page by directly touching the corporate logo, the menu bar, the advertisement, the image, the text or the graphic. Alternatively, the linked web pages may be previewed or temporarily displayed by proximately touching the corporate logo, the menu bar, the advertisement, the image, the text and the graphic included in the web page before being fixedly displayed by directly touching them.

Figure 7A:
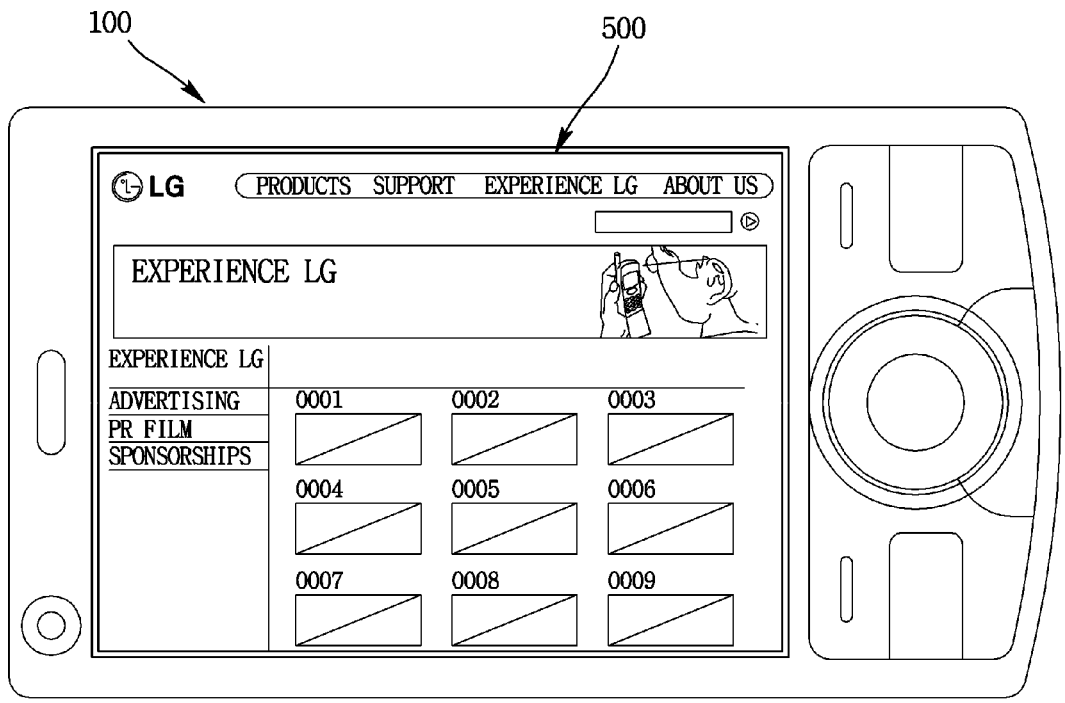
Figure 7B:
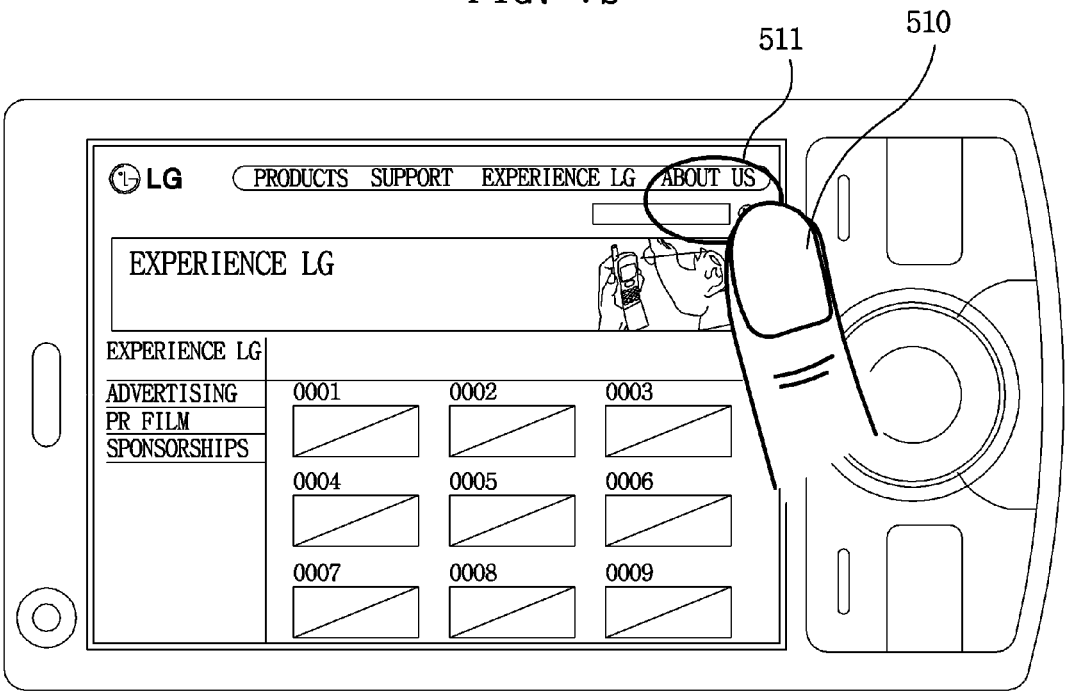

In the following description, while a web page is used as an example to describe the embodiments of the present invention, the same or similar method can be applied to control display of other documents such as text documents. Referring to FIG. 7a, the portable terminal 100 initially displays only an upper area of the web page rather than the entire area of the web page due to size constraint of the touch screen 500. However, the entire area of the web page may be displayed on the touch screen 500 by reducing the size of the web page. Referring to FIG. 7b, when the finger 510 approaches a preset position on the touch screen 500 displaying a web page, the touch screen 500 senses the proximity touch input by the object and transmits an input signal to the controller 180 in response to the proximity touch input. Reference numeral 511 in FIG. 7b defines a position proximately touched by the finger 510 on the touch screen 500. If the proximity touch operation continues for a predetermined period of time, for example, one or more seconds, the controller 180 determines the operation as a proximity touch operation for inputting the user command and displays a control window 520 at a position indicated by the finger 510 as shown in FIG. 7c. The control window 520 is intended to inform the user of a portion currently being displayed on the touch screen 500 out of an entire area of the web page.

FIG. 7c shows a scroll bar displayed on the control window 520. In this embodiment, the scroll bar is vertically formed along a right distal end of the web page displayed on the touch screen 500. A scroll box 521 is formed within the control window for indicating a relative position of the portion of the web page currently being displayed on the touch screen 500. Preferably, the scroll box 521 is formed at or near the position 511 indicated by the finger 510.

While the scroll bar is activated, the finger 510 moves down to a lower area of the web page along the scroll bar, without directly touching the touch screen 500 within a touch recognition effective distance and the scroll box 521 moves along the moving direction of the finger 510. In other words, the finger 510 vertically moves along the surface of the touch screen 500 without directly touching the touch screen maintaining the proximate touch input.

Figure 7E:
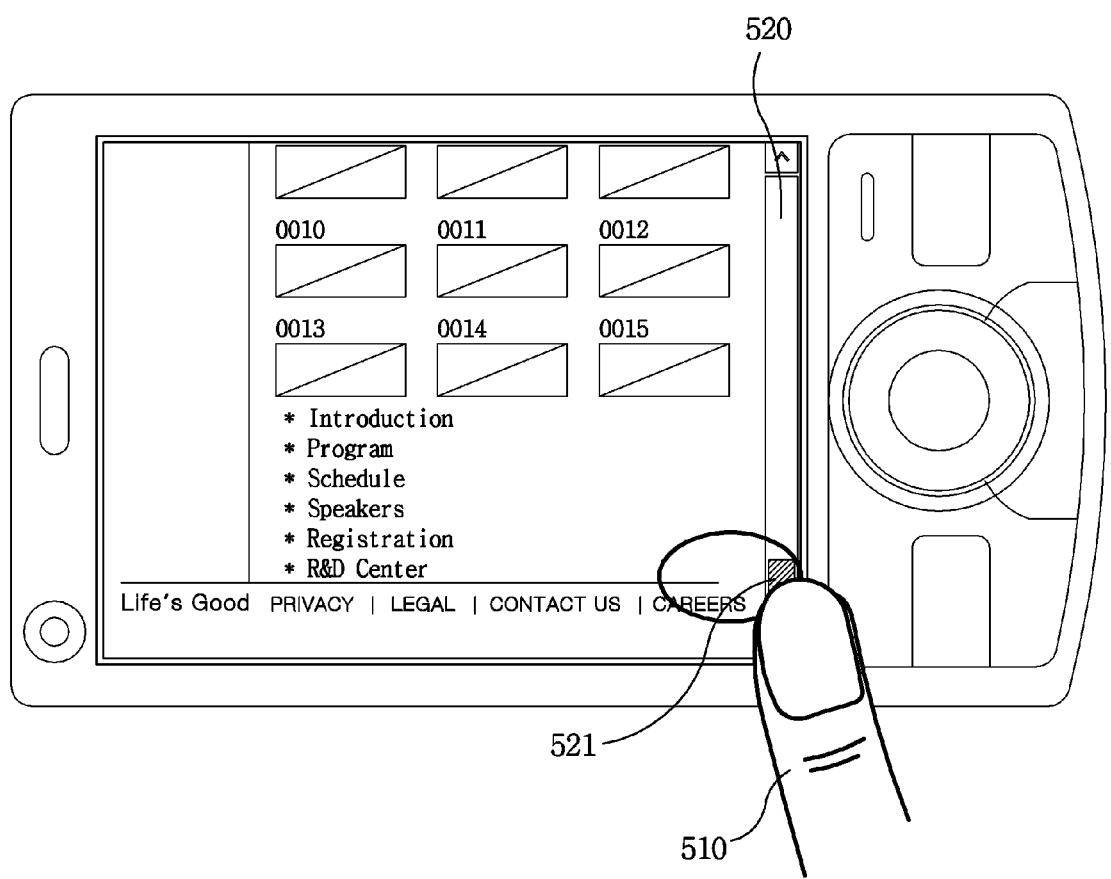

When the scroll box 521 moves from an upper area to a lower area of the control window 520, the web page is scrolled from the upper area to the lower area and displayed on the touch screen 500 according to a sequence illustrated in FIGS. 7d and 7e. In FIG. 7d, a center portion of the web page is displayed on the touch screen 500, and in FIG. 7e, a lower end portion of the web page is displayed on the touch screen 500, the center and lower end portions corresponding to respective positions being pointed by the finger 510.

As noted in FIG. 7a, the portable terminal 100 can provide a preview function for viewing an entire area of the web page in advance using the scroll bar displayed on the touch screen 500 during the proximity touch operation while only the upper area of the web page is initially displayed on the touch screen 500. According to the preview function, a portion of the web page corresponding to a position of the scroll box 521 may be temporarily displayed on the touch screen 500 without being fixedly displayed on the touch screen 500. Thus, if the finger 510 deviates from the touch recognition effective distance in a preview state, the upper area of the web page that was initially displayed is displayed again on the touch screen 500, as illustrated in FIG. 7a.

When the touch screen 500 is directly touched while the scroll box 521 is being moved according to the proximity touch input, a portion of the web page temporarily being displayed or previewed on the touch screen 500 becomes fixedly displayed on the touch screen 500. For example, if the finger 510 moves the scroll box 521 to a lowermost area of the screen with the proximity touch movement and then directly touches the touch screen 500, the lower area of the web page is fixedly displayed on the touch screen 500, as shown in FIG. 7e. As a result, content included in the lower area of the web page can be viewed even if the finger 510 moves way from the touch recognition effective distance after the lower area of the web page is fixedly displayed on the touch screen 500.

Figure 8A:
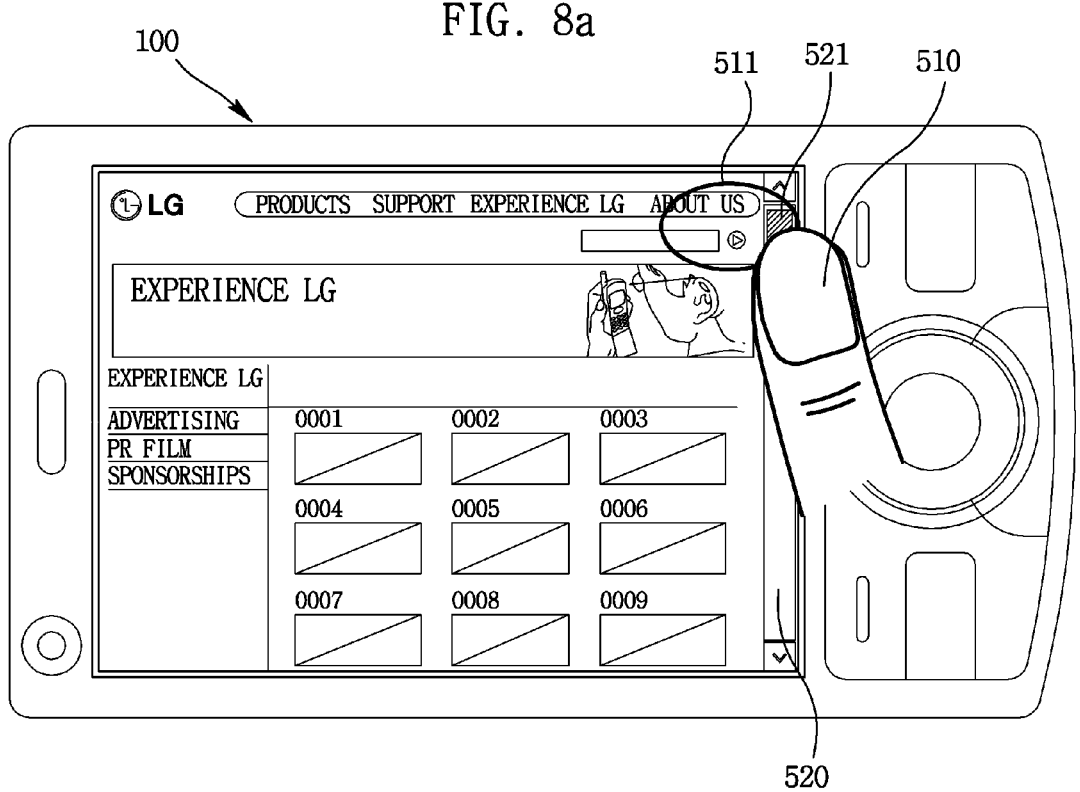
FIGS. 8a-8c are schematic views illustrating adjusting a size of a screen in a portable terminal according to an embodiment of the present invention.
Figure 8B:
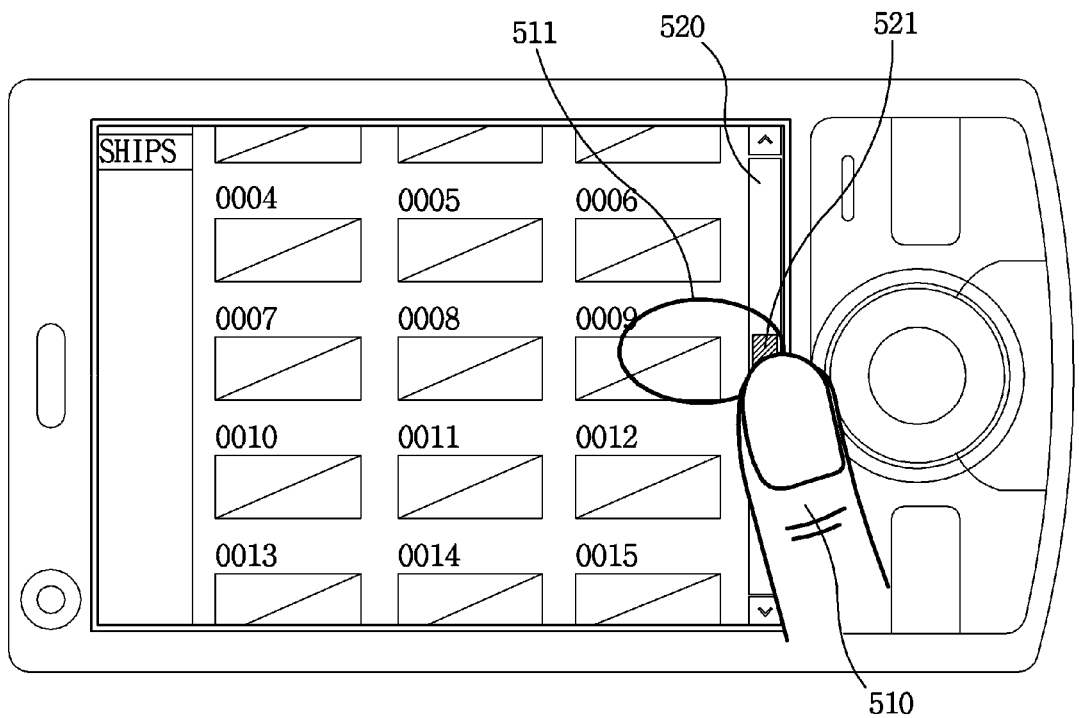
Figure 8C:
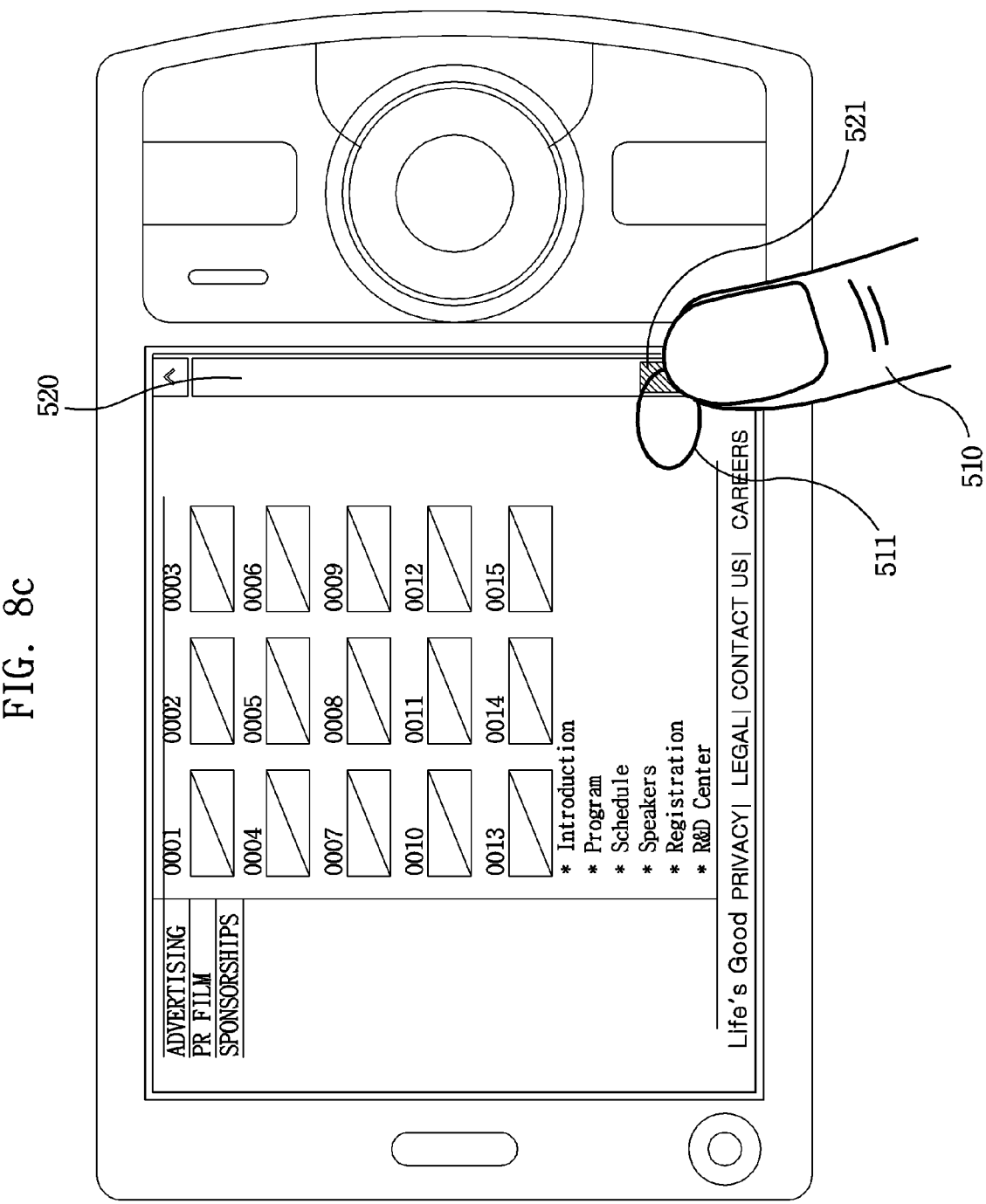

FIGS. 8a-8c illustrate adjusting a size of a screen according to an embodiment of the present invention. Referring to FIG. 8a, when the finger 510 approaches the touch screen 500 while the control window 520 is formed in response to the proximity touch of the touch screen 500 by the finger 510, the web page is displayed with its size enlarged on the screen according to the position 511 on the touch screen 500 indicated by the finger 510.

FIG. 8b shows a web page being enlarged and displayed on the screen according to the position of the scroll box 521 as the finger 510 approaches closer to the touch screen 500. The position on which the scroll box 521 is formed corresponds to the position 511 indicated by the finger 510. Thus, the user can view the enlarged web page of the web page based on the position 511 indicated by the proximity touch of the finger 510.

Referring to FIG. 8c, when the finger 510 is distanced from the touch screen 500 within the touch recognition effective distance while the scroll bar is formed on the touch screen 500, the web page is displayed on the screen with its size reduced based on the position of the scroll box 521. Thus, the user can view the web page of reduced size based on the portion proximately touched by the finger 510. In summary, the size of the screen is adjusted according to the distance between the finger 510 and the touch screen 500 within the touch recognition effective distance. Therefore, the distance between the finger 510 and the touch screen 500 shown in FIG. 8b is shorter than the distance shown in FIG. 8a or 8c.

Figure 9A:
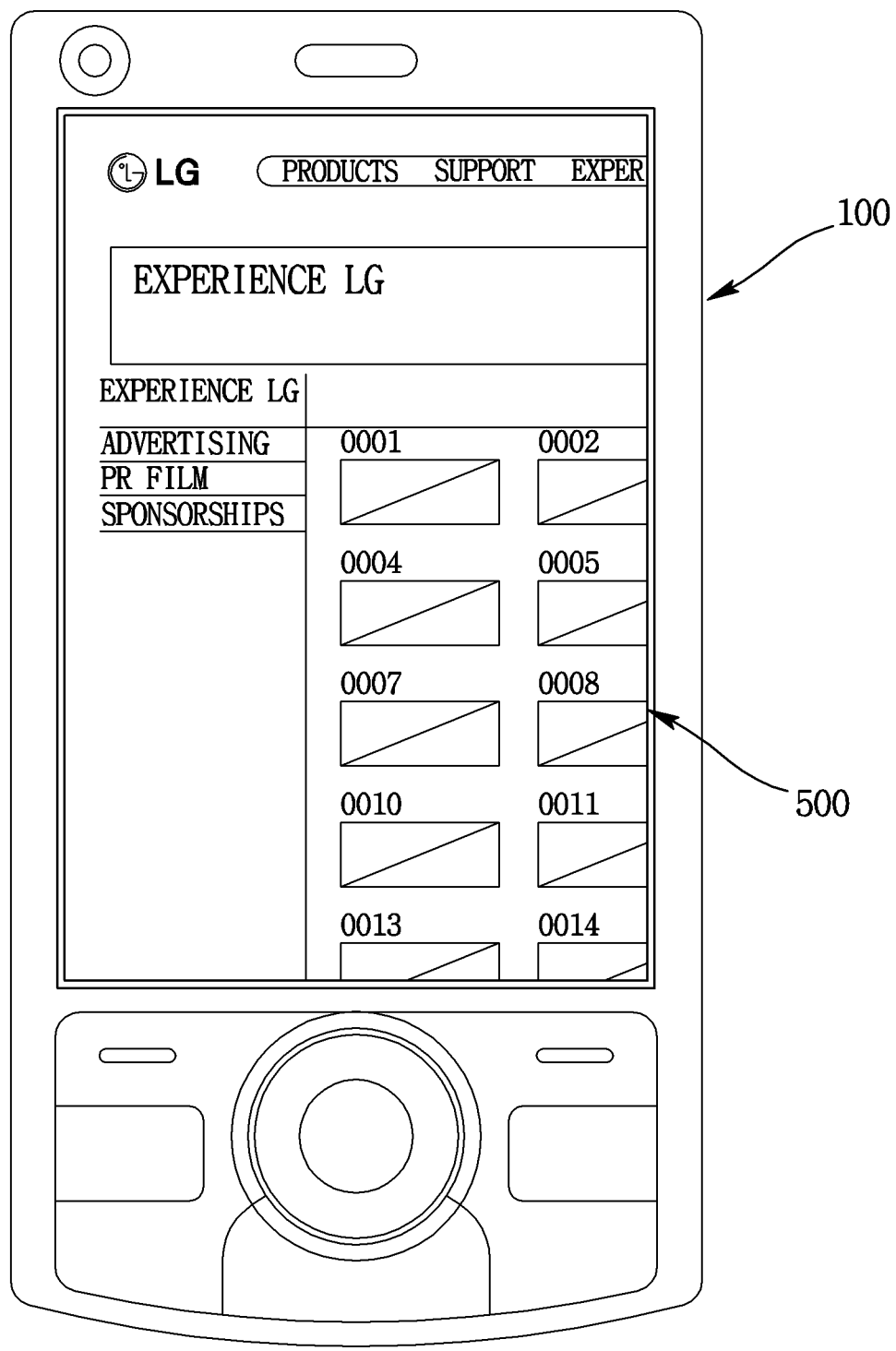
FIGS. 9a-9e are schematic views illustrating controlling a screen in a portable terminal according to an embodiment of the present invention.

FIGS. 9a-9e illustrates controlling a screen in a portable terminal capable of sensing proximity touch according to an embodiment of the present invention. Referring to FIG. 9a, unlike in FIGS. 7a-7e and 8a-8c, the content on the touch screen 500 of the portable terminal 100 is displayed in a portrait orientation, a left upper area of the web page being displayed on the screen.

Figure 9B:
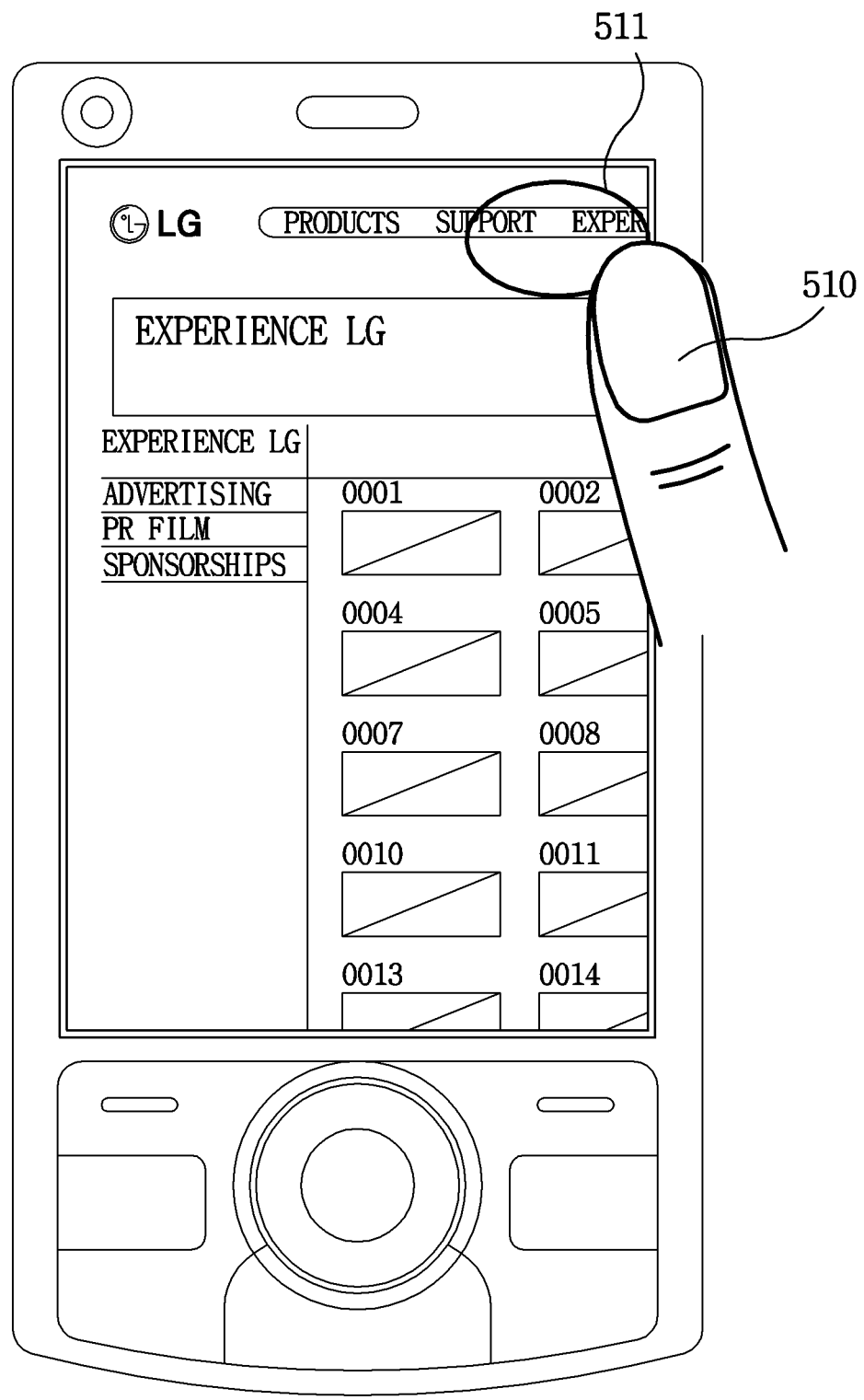
Figure 9C:
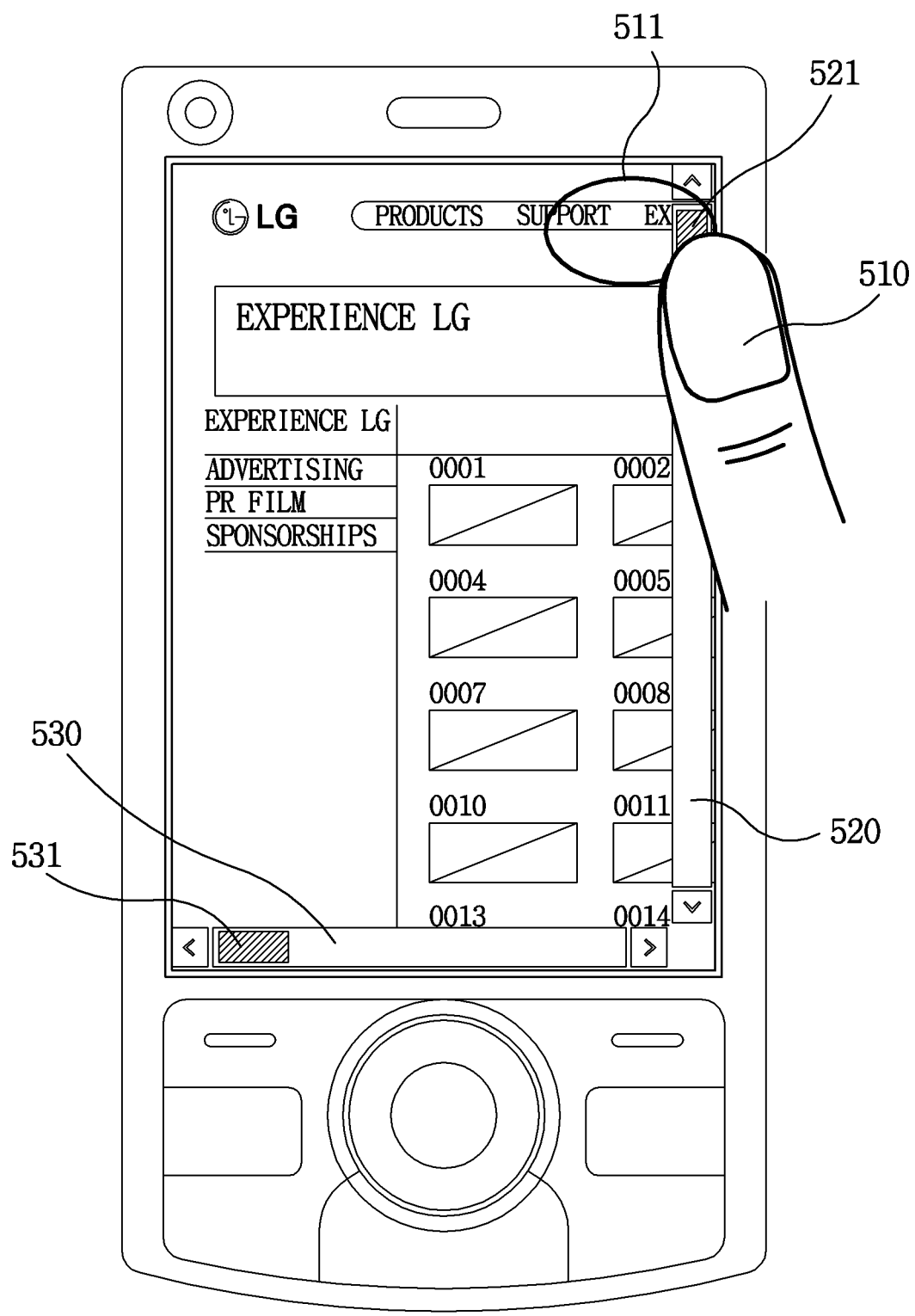

Referring to FIG. 9b, when an object or a finger 510 approaches a preset position 511 of the touch screen 500 displaying a web page, the touch screen 500 senses the proximity touch input of the finger 510 to transmit an input signal to the controller 180 in response to the proximity touch input. Thereafter, the controller 180 determines the input signal as a proximity touch operation for inputting a user command if the proximity touch operation continues for a preset period of time and displays control windows 520, 530 at predetermined areas on the touch screen 500 as shown in FIG. 9c. The control windows 520, 530 are intended for informing the user of the portion of the web page currently being displayed on the touch screen 500, each of the control windows 520, 530 being formed with a scroll bar.

The first control window 520 is vertically formed along the right end portion of the web page displayed on the touch screen 500, a first scroll bar being formed for vertically scrolling the web page. A first scroll box 521 formed within the first control window 520 indicates a vertical position of the web page currently being displayed on the touch screen 500.

A second control window 530 is horizontally formed along a lower end of the web page and is formed therein with a second scroll bar for scrolling the web page to the left/right, i.e., in the horizontal direction. A second scroll box 531 formed within the second control window 530 indicates a horizontal position of a portion of the web page currently being displayed on the touch screen 500. Thus, the web page displayed on the touch screen 500 can be scrolled not only in the up/down direction but also in the left/right direction using the first and second control windows 520, 530.

Figure 9D:
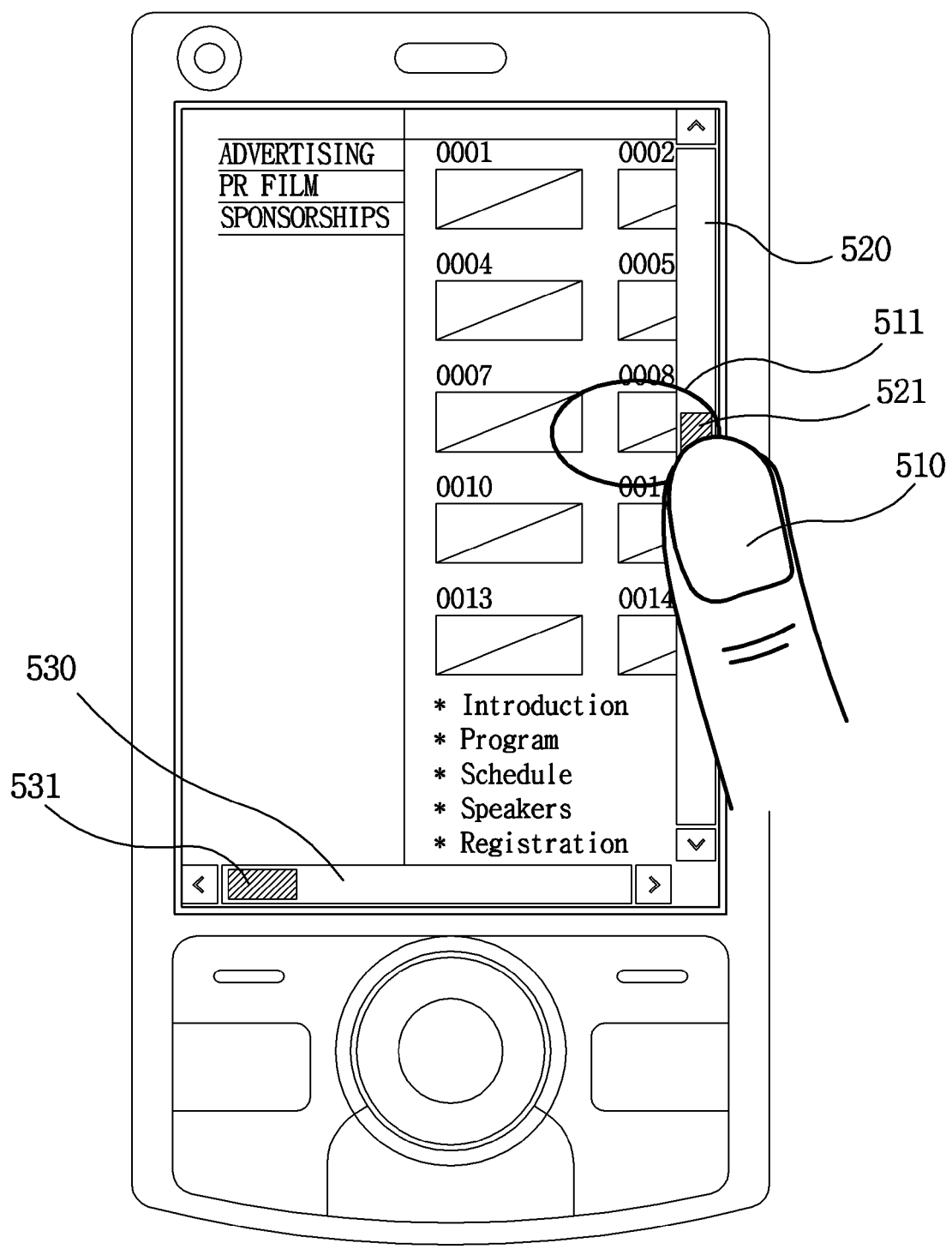
Figure 9E:
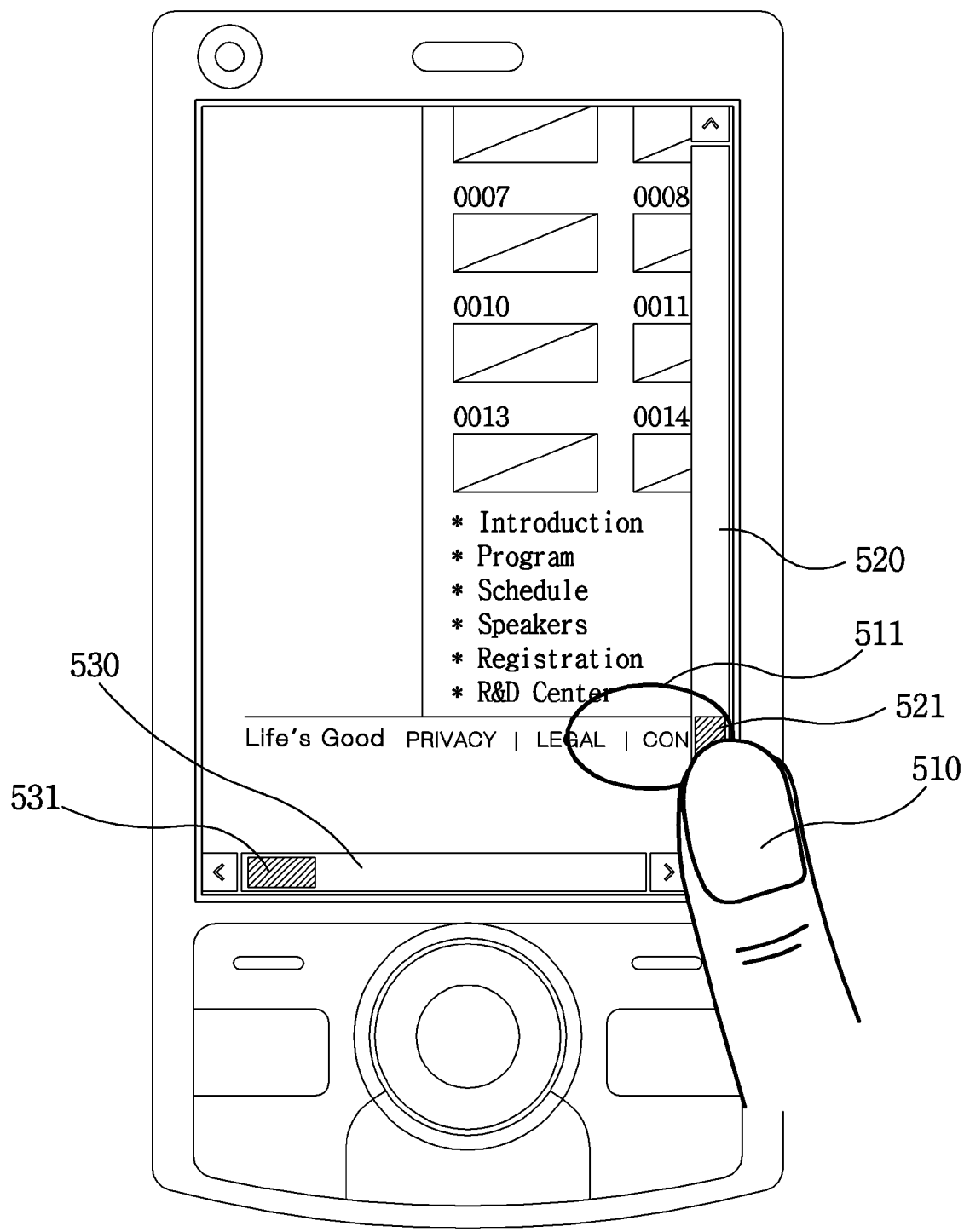

For example, when the finger 510 performs a downward proximity position movement of the web page along the first scroll bar while the first and second scroll bars are activated, the first scroll box 521 moves according to the movement of the finger 510. Thus, when the first scroll box 521 moves within the first control window 520, the web page is scrolled from the upper area to the lower area and displayed on the touch screen 500 according to the sequence shown in FIGS. 9d and 9e. In FIG. 9d, a left center portion of the web page is displayed on the touch screen 500, and in FIG. 9e, a left lower area of the web page is displayed on the touch screen 500.

When the finger 510 performs the proximity position movement from left to right direction of the web page along the second scroll bar, the touch screen 500 displays the web page being scrolled in the left to right direction. Furthermore, a preview function may be provided to view the entire area of the web page in advance using the first and second scroll bars displayed on the touch screen 500 during the proximity touch operation while the left upper area of the web page is fixedly displayed on the touch screen initially as illustrated in FIG. 9a. Once the finger 510 deviates from the touch recognition effective distance, the upper area of the web page is fixedly displayed again on the touch screen 500 as displayed initially.

When the finger 510 directly touches the touch screen 500 while moving the first scroll box 521 or the second scroll box 531 under the proximity touch state, the portion of the web page currently and temporarily displayed on the touch screen 500 according to the preview function is fixed and displayed on the touch screen 500. For example, when the finger 510 moves the first scroll box 521 to a lowermost area of the first control window 520 under the proximity touch operation and directly touches the touch screen 500, the left lower area of the web page is fixedly displayed on the touch screen 500. Following the fixed display of the left lower area of the web page on the touch screen 500, the contents included in the left lower area of the web page displayed on the touch screen 500 can be viewed even if the finger 510 moves away from the touch recognition effective distance.

Figure 10A:
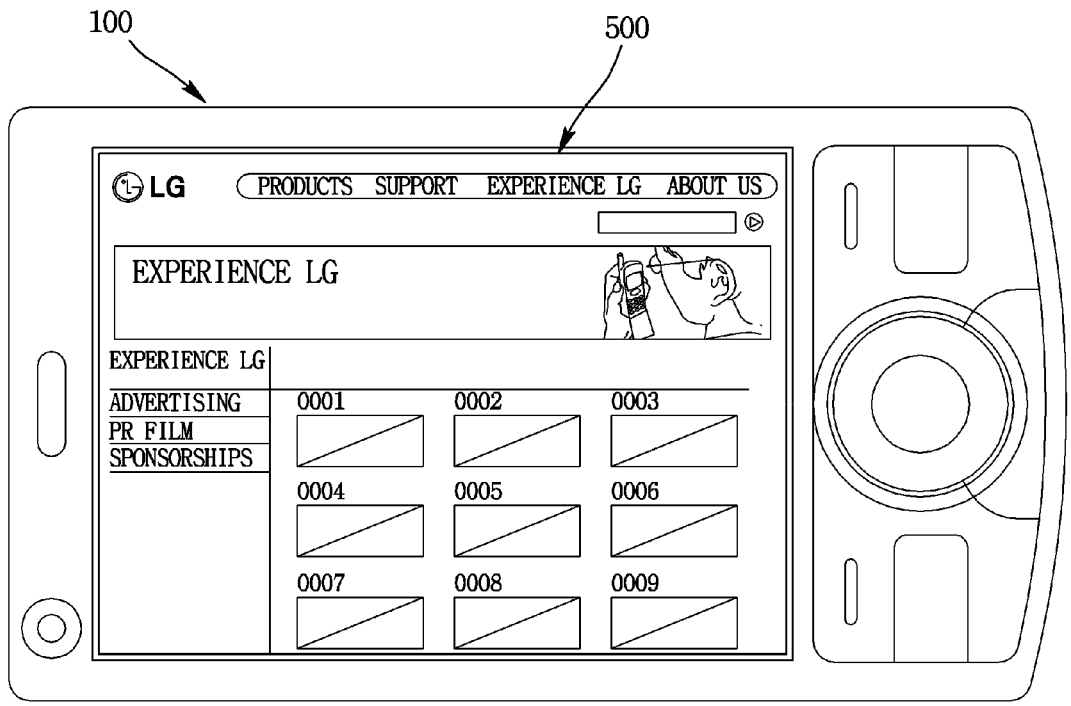
FIGS. 10a-10e are schematic views illustrating controlling a screen in a portable terminal according to an embodiment of the present invention.

FIGS. 10*a*-10*e* illustrate controlling a screen in a portable terminal 100 capable of sensing proximity touch according to an embodiment of the present invention. FIG. 10*a* illustrates an upper area of the web page displayed on the touch screen 500 of the portable terminal 100.

Figure 10B:
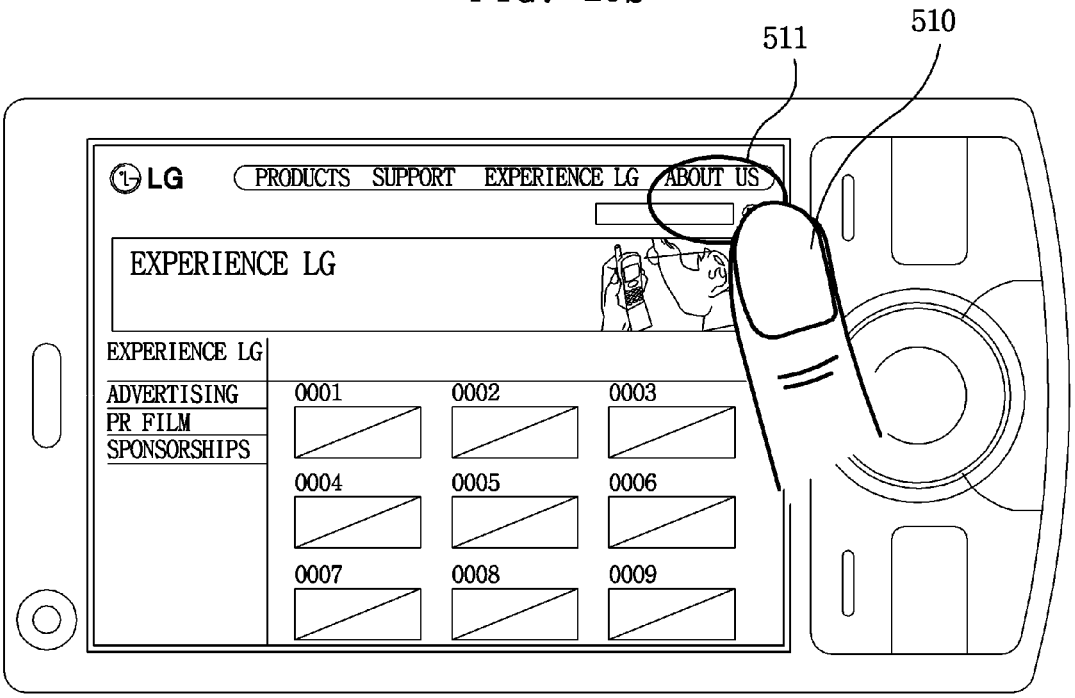

Referring to FIG. 10*b*, when an object or a finger 510 approaches a preset position on the touch screen 500 displaying a web page, the touch screen 500 senses the proximity touch input by the finger 510 and transmits an input signal to the controller 180 in response to the proximity touch input. If the proximity touch operation continues for a preset period of time, the controller 180 determines that the input signal is a proximity touch operation for inputting a user command and displays the control window 530 at a predetermined area on the main screen 512 of the touch screen 500, as shown in FIG. 10*c*.

Figure 10C:
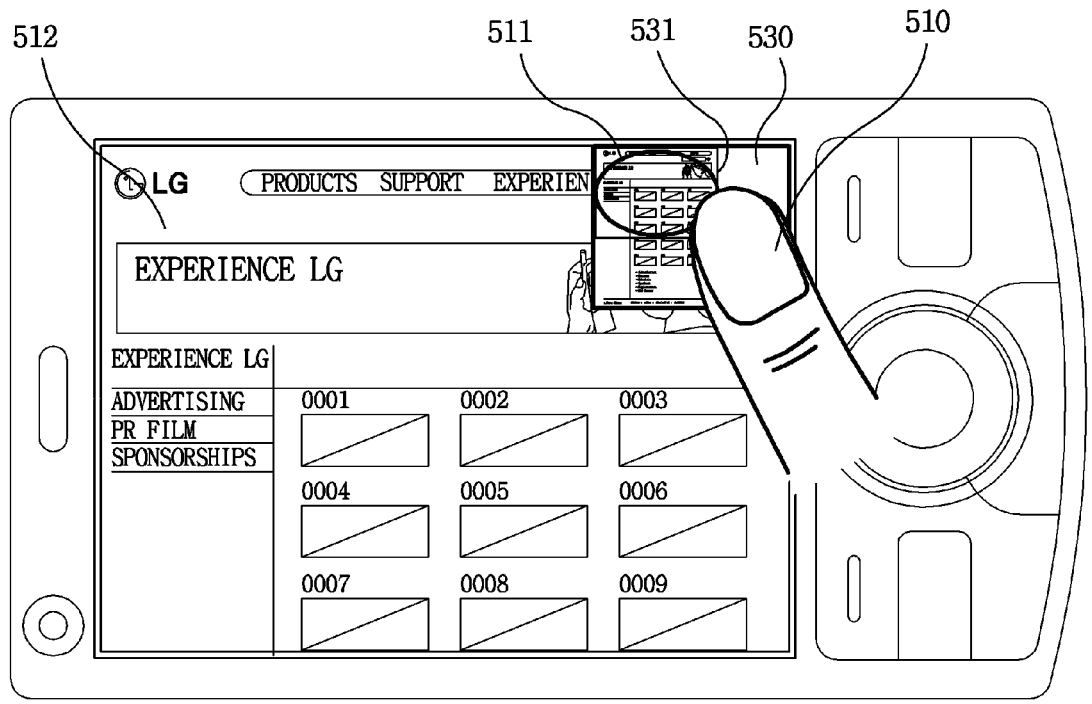

Referring to FIG. 10*c*, the control window 530 serves as a mini map for informing a user of a portion of the web page currently displayed on the touch screen 500. The controller 180 reduces the entire area of the web page to cater to the size of the control window 530 and displays the reduced entire area of the web page within the control window 530. The controller 180 forms a scroll box 531 for indicating a portion of the web page currently being displayed on the touch screen 500.

The control window 530 is formed at a predetermined area based on the position 511 proximately touched by the finger 510 on the touch screen 500, and the control window 530 is formed therein with a scroll box 531 for scrolling the web page in up/down and left/right directions. Thus, the web page displayed on the touch screen 500 can be scrolled up/down and left/right using the control window 530.

Figure 10D:
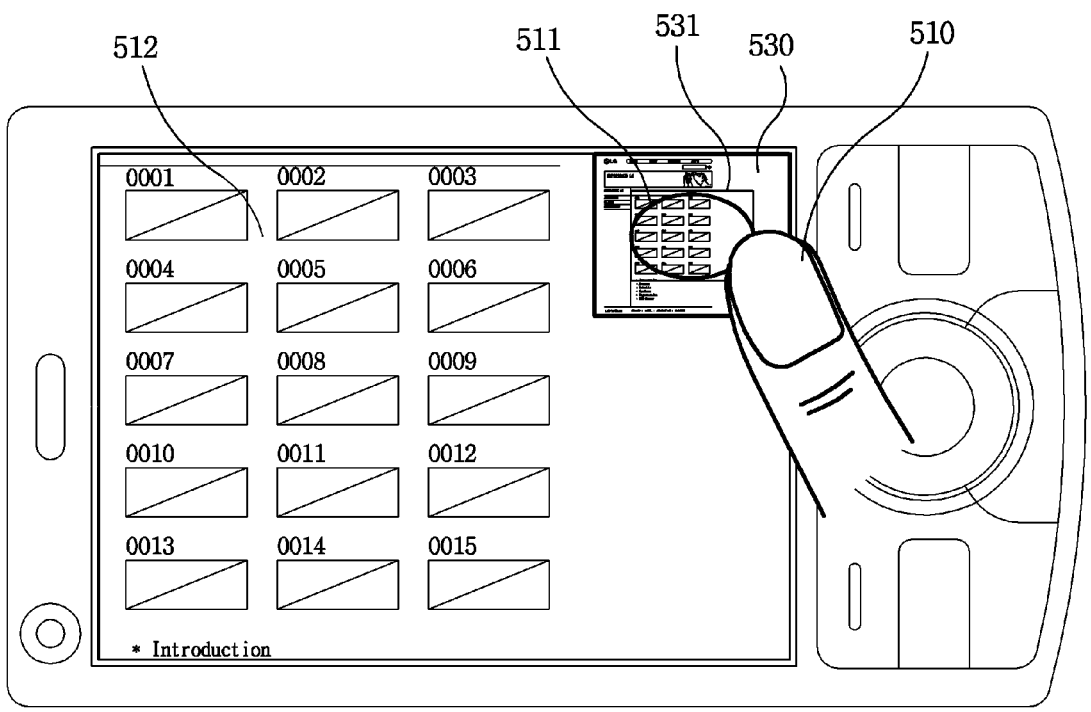
Figure 10E:
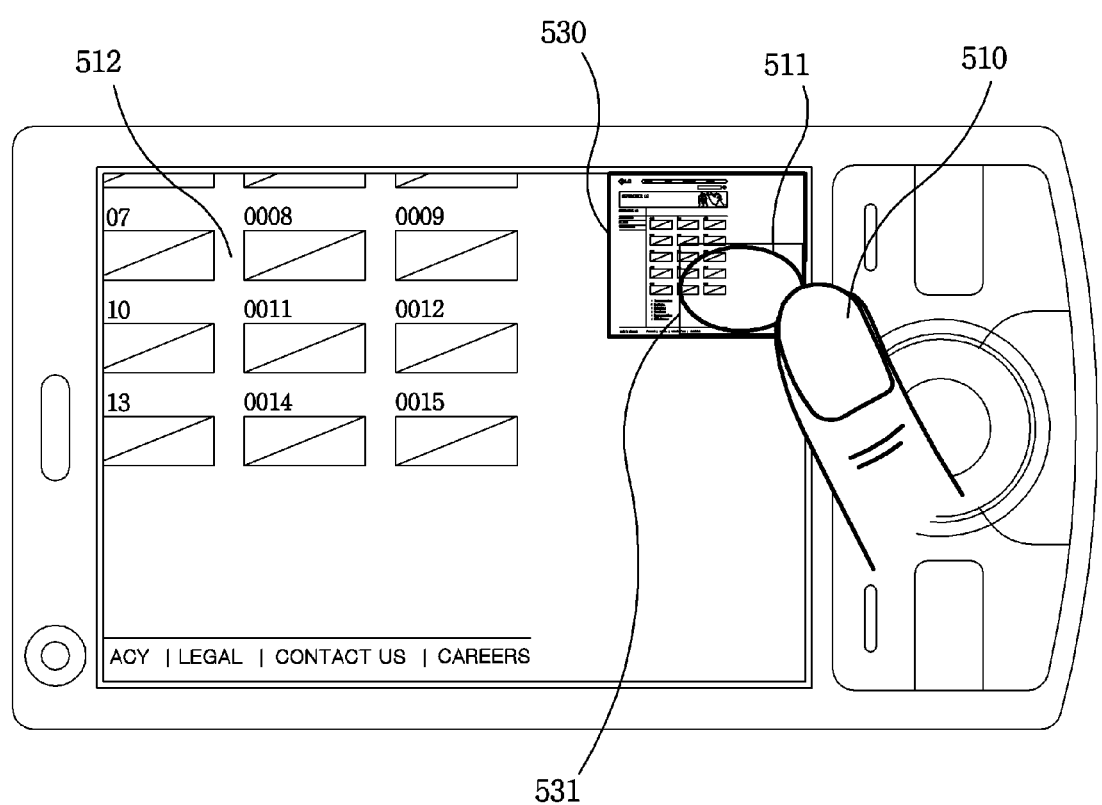

For example, when the finger 510 performs vertical and horizontal proximity position movements within the control window 530 while the control window 530 and the scroll box 531 are activated, the scroll box 531 moves according to the movement of the finger 510. When the scroll box 531 moves within the control window 530, the web page is scrolled vertically or/and horizontally, and displayed on the main screen 512, as shown in FIGS. 10*d* and 10*e*. In FIG. 10*d*, a center portion of the web page is displayed on the touch screen 500, and in FIG. 10*e*, a right lower portion of the web page is displayed on the touch screen 500, the center and right lower portions corresponding to the position of the finger 510 in the control window 530.

According to an embodiment of the present invention, only the upper area of the web page may be initially fixedly displayed on the touch screen 500 using the control window 530 and the scroll box 531 displayed on the touch screen 500 during the proximity touch operation, as shown in FIG. 10*a*. Furthermore, the disclosed embodiments may also provide a preview function to view the entire area of the web page in advance using the control window 530 while only the upper area of the web page is displayed. When the finger 510 deviates from the touch recognition effective distance while the web page is being previewed, the upper area out of the entire area of the web page initially fixedly displayed on the touch screen 500 is displayed again on the touch screen 500, as illustrated in FIG. 10*a*.

When the finger 510 directly touches the touch screen 500 while the scroll box 531 is being moved by the proximity touch operation, a portion of the web page temporarily being displayed on the touch screen 500 is fixed and displayed on the touch screen 500. For example, when the finger 510 moves the scroll box 531 downward toward the right side of the control window 530 using the proximity touch operation and then directly touches the touch screen 500, the right lower area of the web page is fixedly displayed on the main screen 512, as shown in FIG. 10*e*. Subsequent to the right lower portion of the web page being fixedly displayed on the main screen 512, the user may view the contents included in the right lower portion of the web page displayed on the main screen 512 even after the finger 510 moves away from the touch recognition effective distance.

Figure 11A:
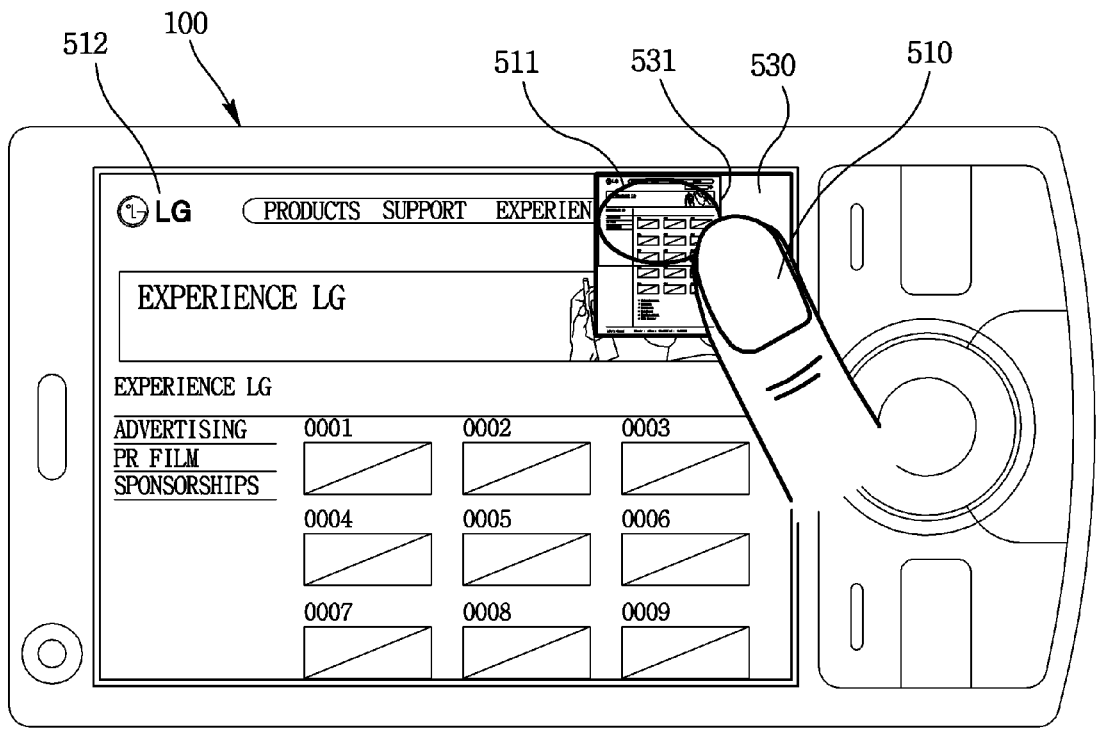
Figure 11B:
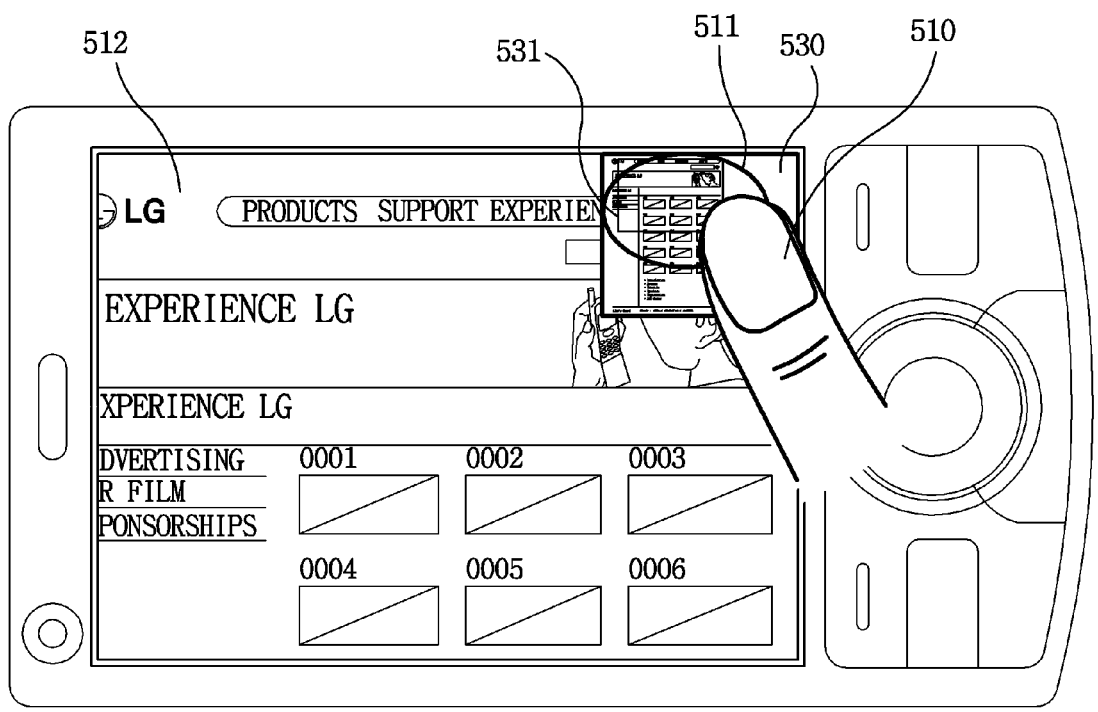

FIGS. 11*a*-11*c* illustrate adjusting a size of a screen according to an embodiment of the present invention. When the finger 510 approaches the touch screen 500 as shown in FIG. 11*a* while the finger 510 proximately touches the touch screen 500 to form the mini map on the control window 530 at the right upper area of the screen, the scroll box 531 is reduced in size within the control window 530 at the position indicated by the finger 510 as shown in FIG. 11*b*. Subsequently, a portion of the web page corresponding to an area surrounded by the scroll box 531 among the entire area of the reduced web page displayed within the control window 530 is displayed on the main screen 512 of the touch screen 500 in an increased size. Thus, the user may view the portion proximately touched by the finger 510 in the web page in an enlarged size.

When the finger 510 is moved away from the touch screen 500 within the touch recognition effective distance while the finger 510 proximately touches the touch screen 500 to form the mini map on the control window 530 at the right upper area of the screen as illustrated in FIG. 11*a*, the scroll box 531 is increased in size within the control window 530 at the position 511 indicated by the finger 510 as illustrated in FIG. 11*c*. Subsequently, a portion of the web page corresponding to an area surrounded by the scroll box 531 out of the entire area of the reduced web page displayed within the control window 530 is displayed in reduced size on the main screen 512 of the touch screen 500. Thus, the user may view the portion of the web page in the reduced size.

Figure 12B:
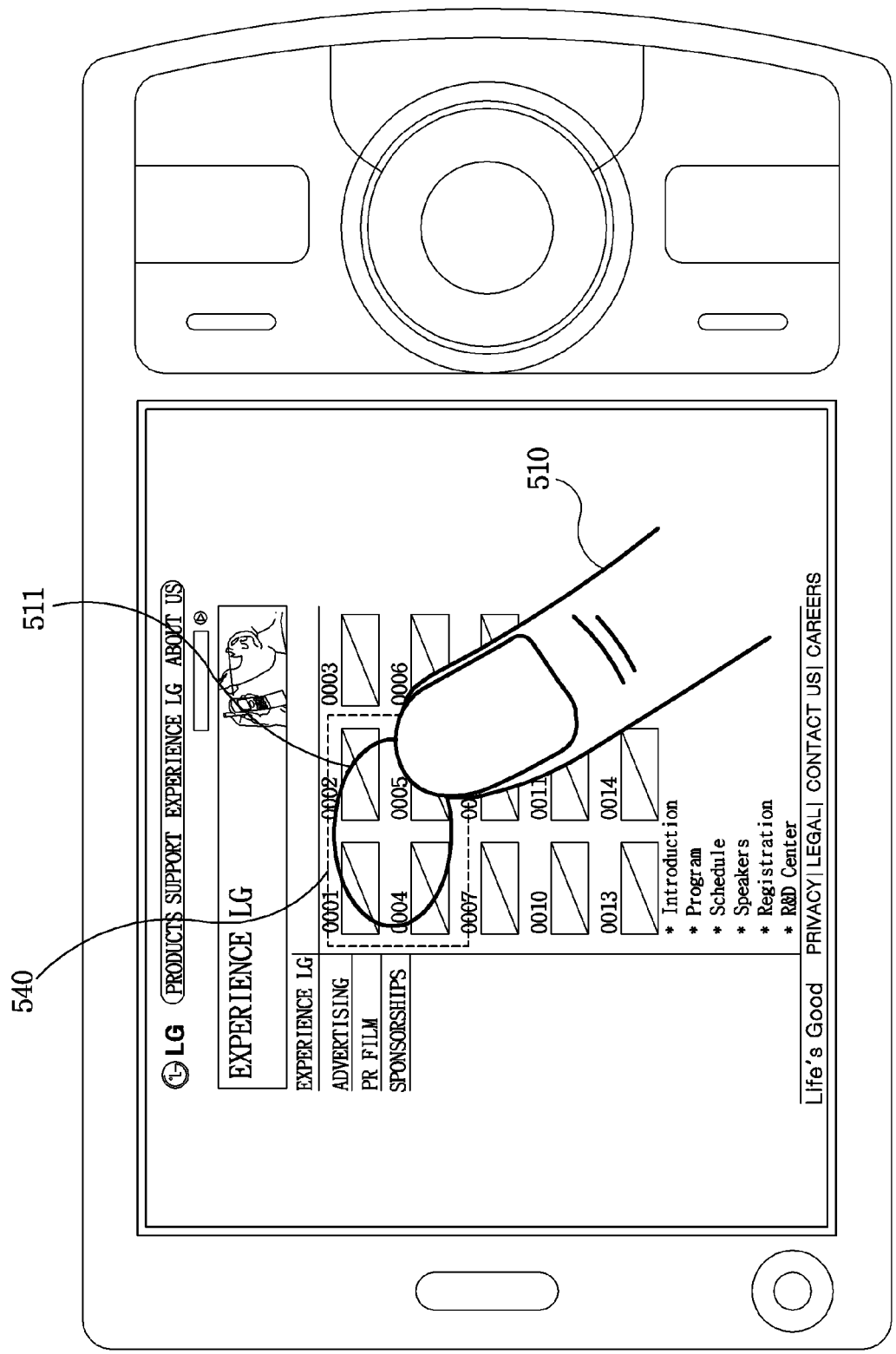

FIGS. 12*a*-12*d* illustrate controlling a screen in a portable terminal 100 capable of sensing proximity touch according to an embodiment of the present invention. FIG. 12*a* illustrates an entire area of the web page displayed in a landscape configuration on the touch screen 500 of the portable terminal 100.

Figure 12C:
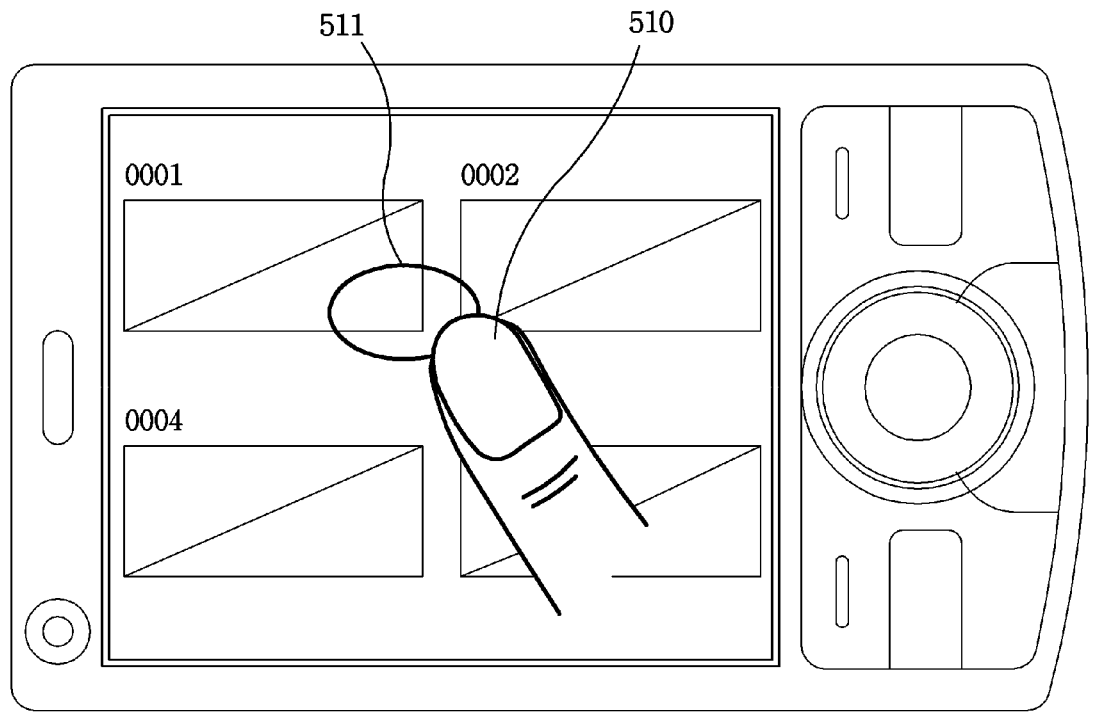

Referring to FIG. 12*b*, when an object or a finger 510 approaches a preset position of the touch screen 500 displaying a web page, the touch screen 500 senses the proximity touch input by the object and transmits an input signal to the controller 180 in response to the proximity touch input. The controller 180 determines that the input signal is a proximity touch operation for inputting a user command if the proximity touch operation continues for a preset period of time and displays a predetermined portion 540 of the web page in an increased size on the touch screen 500 based on a position 511 proximately touched by the finger 510 on the touch screen 500 as shown in FIG. 12*c*.

Figure 12D:
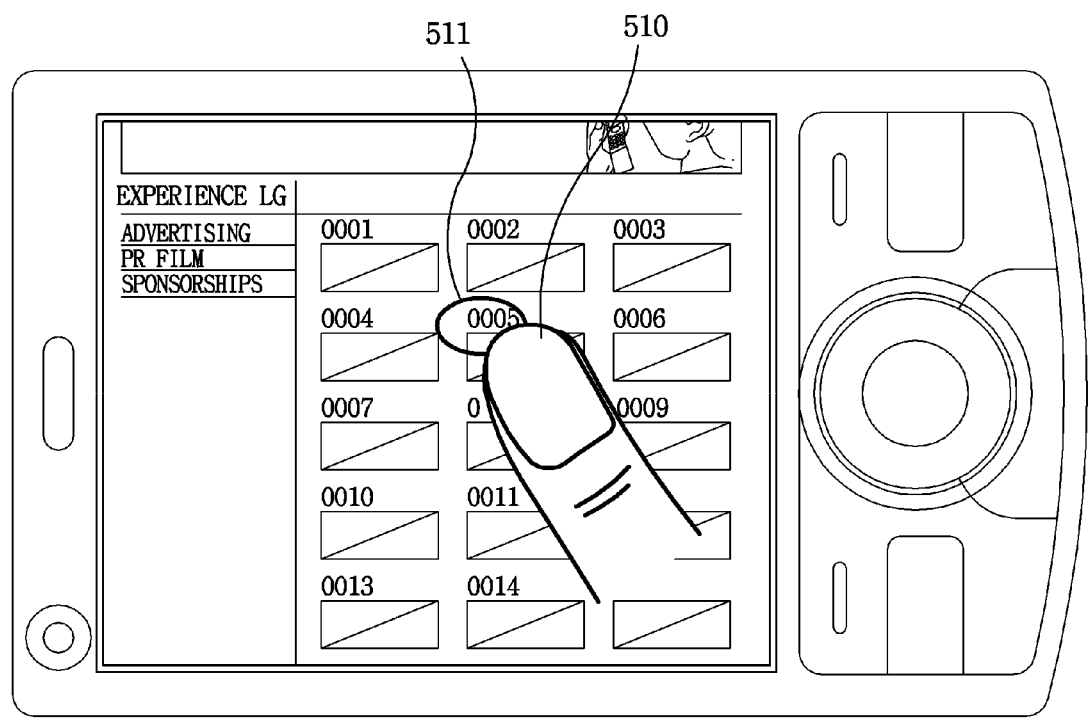

When the finger 510 deviates from the touch screen 500 within the touch recognition effective distance, the web page is displayed in a reduced size based on the position 511 proximately touched by the finger 510 as shown in FIG. 12*d*. Thus, the user may view the web page in a reduced size at the portion proximately touched by the finger 510 in the web page.

Furthermore, when the finger 510 directly touches the touch screen 500 while the web page is displayed on the touch screen 500 in an increased size or in a reduced size, as the finger 510 changes the proximity touch distance, a portion of the web page currently being displayed on the touch screen 500 is fixedly displayed on the touch screen 500. Subsequent to the portion of the web page being fixedly displayed on the touch screen 500, the user may view the contents included in the portion of the web page displayed on the touch screen 500 even if the finger 510 moves out of the touch recognition effective distance.

Furthermore, the controller 180 may measure a time during which the finger 510 proximately touches the predetermined position on the touch screen 500 and change the size of the web page displayed on the touch screen 500 in response to the proximate touch time. For example, when a preset time (for example, three seconds) lapses while the finger 510 proximately touches a preset position on the touch screen 500, the controller 180 may enlarge the size of the web page displayed on the touch screen 500, or alternatively reduce the size of the web page.

Figure 13A:
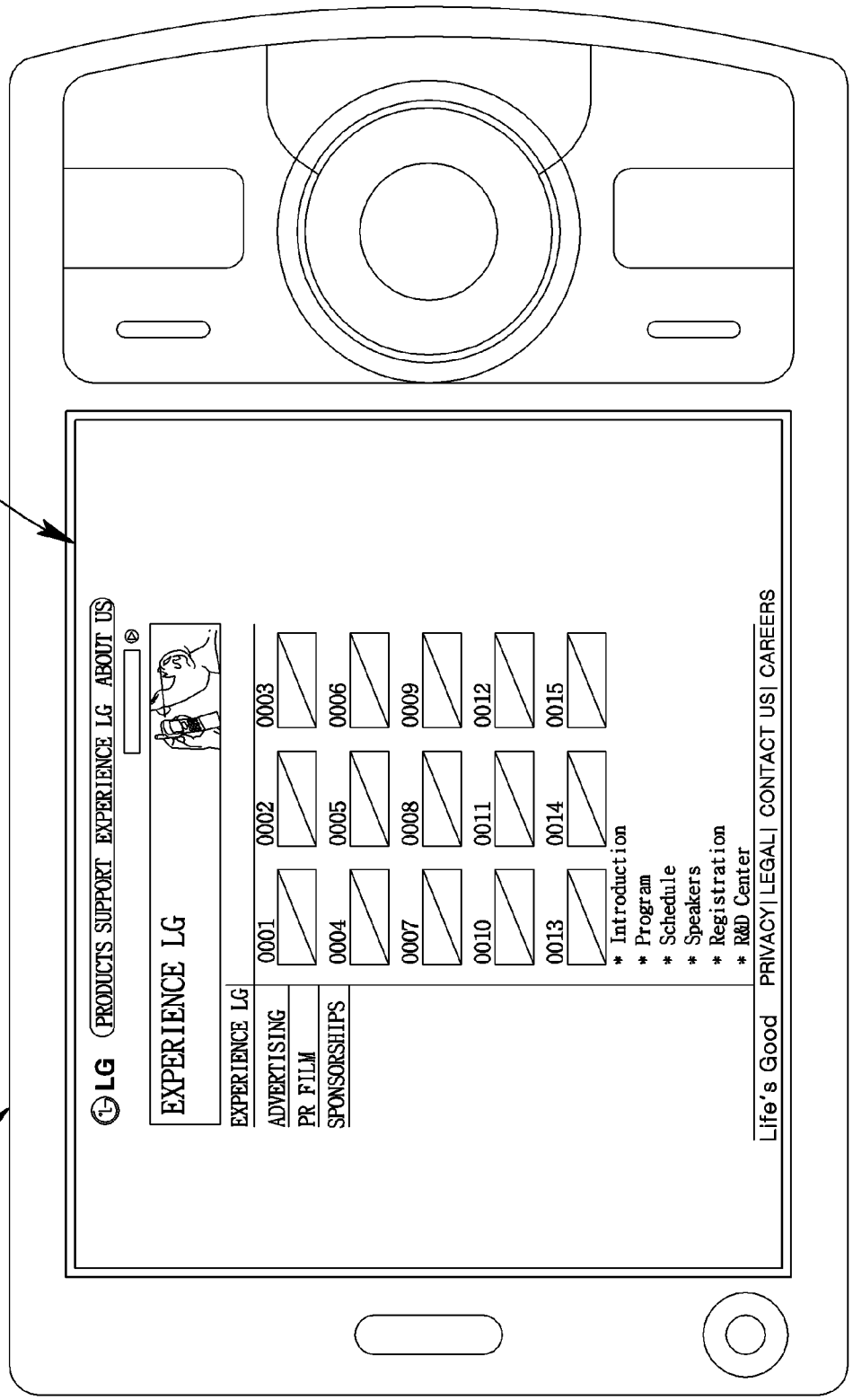
FIGS. 13a-13d are schematic views illustrating controlling a screen in a portable terminal according to an embodiment of the present invention.

FIGS. 13a-13d illustrate controlling a screen in a portable terminal 100 capable of sensing proximity touch according to an embodiment of the present invention. FIG. 13a shows an entire area of the web page displayed in a landscape orientation on the touch screen 500 of the portable terminal 100.

Figure 13B:
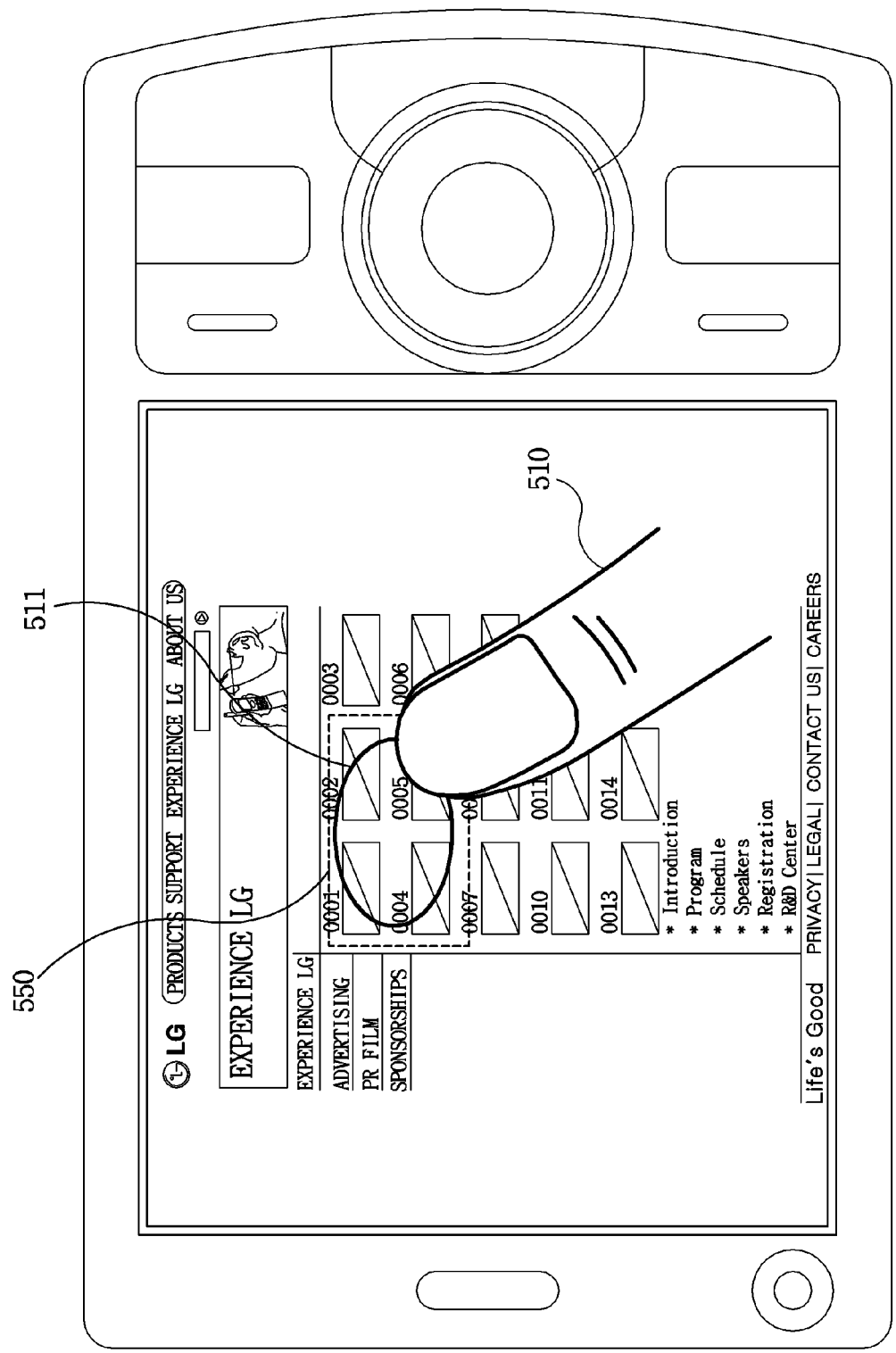
Figure 13C:
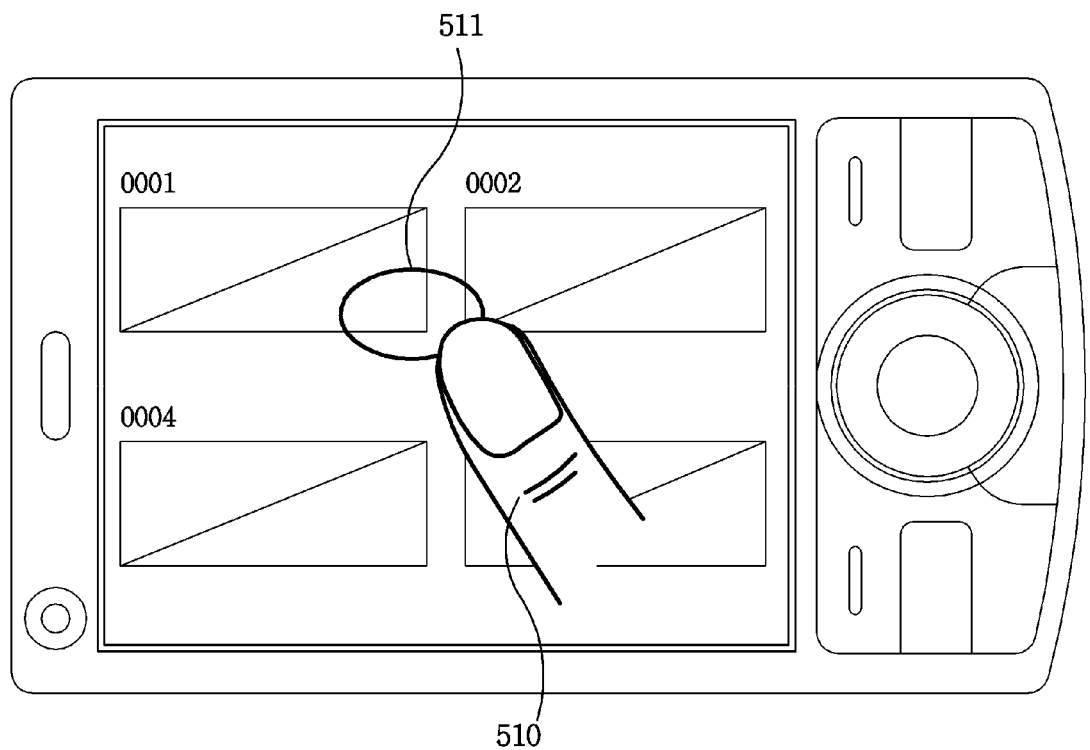

Referring to FIG. 13b, when an object or a finger 510 approaches a preset position of the touch screen 500 displaying a web page, the touch screen 500 senses the proximity touch input by the finger 510 and transmits an input signal to the controller 180 in response to the proximity touch input. The controller 180 determines that the input signal is a proximity touch operation for inputting a user command if the proximity touch operation continues for a predetermined period of time, and captures a predetermined portion 550 of the web page based on the position 511 proximately touched by the finger 510 on the touch screen 500, and enlarges the captured portion 550 for display on the touch screen as illustrated in FIG. 13c.

Figure 13D:
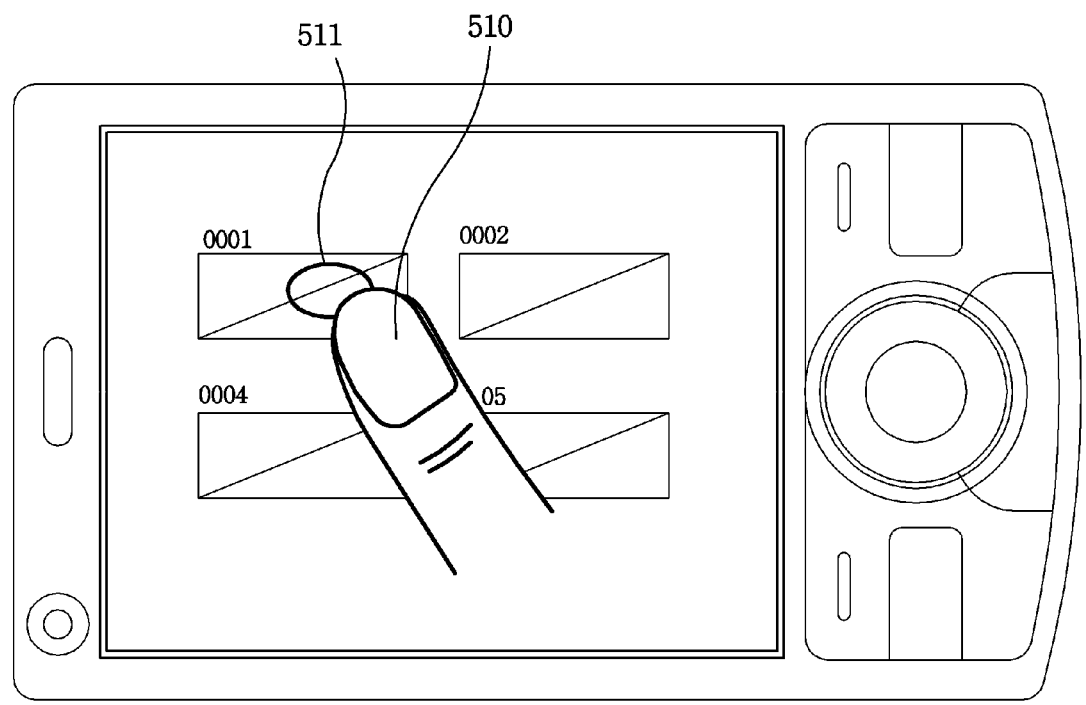

When the finger 510 deviates from the touch screen 500 within the touch recognition effective distance of the touch screen 500 while the captured portion 550 is displayed on the touch screen 500 as the finger 510 proximately touches the touch screen 500, only the captured portion 550 in the web page is displayed in a reduced size on the entire screen of the touch screen 500 as shown in FIG. 13d. Furthermore, when the finger 510 directly touches the touch screen 500 while the captured portion of the web page is displayed on the touch screen 500 in the reduced size or in the increased size as the proximity touch distance is changed by the finger 510, the portion of the web page currently being displayed on the touch screen 500 is fixedly displayed on the touch screen 500. Subsequent to the portion of the web page being fixedly displayed on the touch screen 500, the user may view the contents included in the portion of the web page displayed on the touch screen 500 even if the finger 510 moves away from the touch recognition effective distance.

Figure 14:
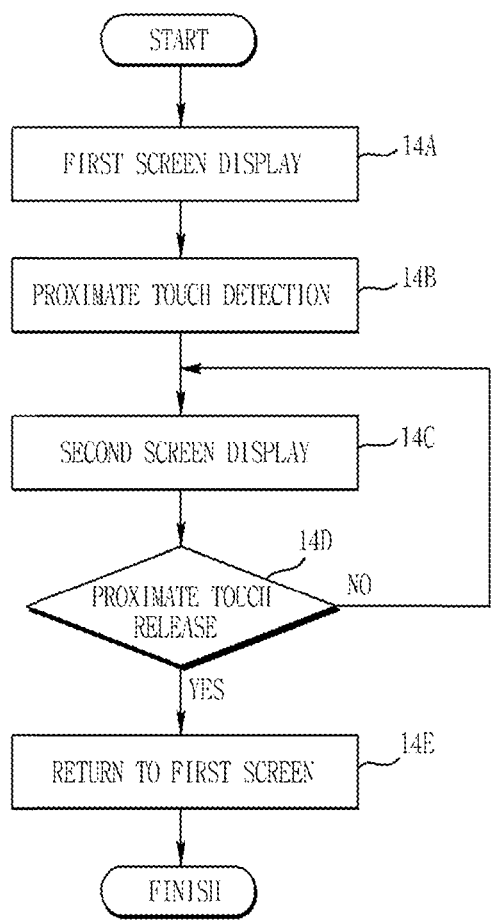
FIG. 14 is a flowchart illustrating a method for displaying a screen of a portable terminal according to an exemplary embodiment of the present invention.

FIG. 14 is a flowchart illustrating a method for displaying a screen of a portable terminal according to an exemplary embodiment of the present invention.

Referring to FIG. 14, the controller 180 may display a first screen (S14A). The first screen may be a screen configured to illustrate a performance state of a particular function, or a screen of an idle state.

In a case a predetermined area of the first screen is proximately touched by a pointer, the controller may cause the display unit 151 to display a second screen (S14B, S14C). The second screen may be a screen related to a proximately touched area. The second screen may be a preview in which a preview function is performed. In this embodiment, the "preview function" defines a display of a particular screen configured to allow a user to pre-study a state of a particular screen prior to entering to the particular screen. The preview function-performed screen may be displayed on an entire area of the display unit 151, or may be displayed only on one portion of the display unit 151. For example, the preview function-performed screen may be displayed on a particular area of the first screen in a thumbnail format. Furthermore, the second screen may be configured in a plural number to be displayed in a slide format.

In a case where a proximately touched area is an area where a particular item is displayed, the controller 180 may display a screen where information related to the particular item is displayed. For example, in a case where the particular item is a particular menu, the controller 180 may display a submenu of the particular menu.

Meanwhile, the controller 180 may allow the displayed second screen to disappear, and return to the first screen, in a case where the proximity touch is released (S14D, 14E). That is, the controller 180 may cause the display unit 151 to display the second screen in advance in response to detection of the proximate touch, and may return the second screen to an original screen (i.e., the first screen) in response to release of the proximate touch. The term of "release of the proximate touch" refers to a case where a pointer deviates from a screen to an outside of a predetermined distance, and the proximate touch is not detected. In the present invention, the predetermined distance is called a proximate touch detection area, for convenience sake.

Next, the method for displaying a screen of a portable terminal illustrated in FIG. 14 will be described in more details.

Figure 15:
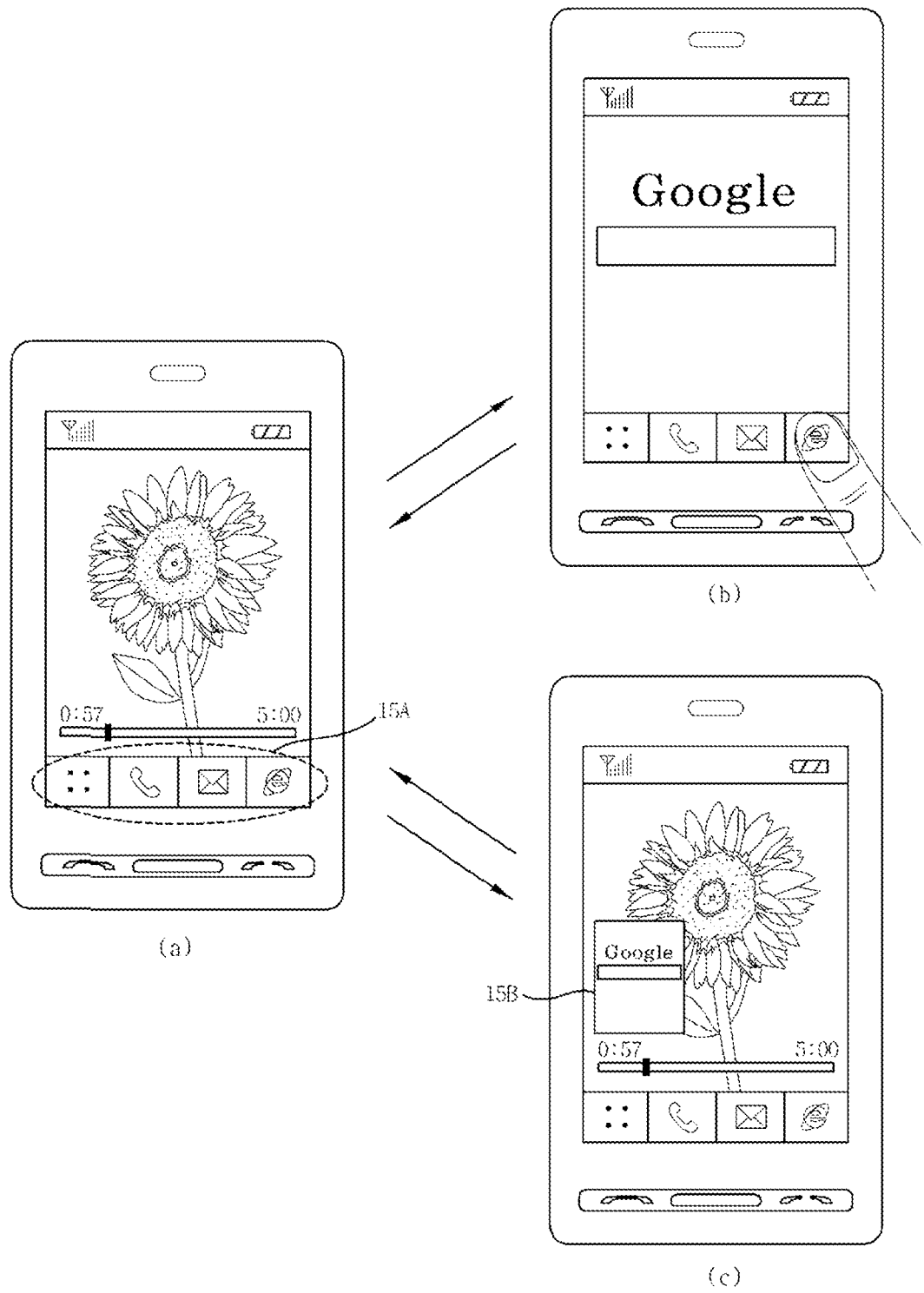
FIGS. 15~22 illustrate examples of the method for displaying a screen of a portable terminal illustrated in FIG. 14.

FIG. 15 is a schematic view illustrating a state configured to display a screen on which a proximately touched item and related application are being performed (executed) while a multi-tasking is performed by a portable terminal, where the multi-tasking refers to simultaneous performance of a plurality of applications.

FIG. 15(a) illustrates a screen configured to display a state where a plurality of applications is performed. That is, FIG. 15(a) illustrates a state of any one application among of the plurality of performed applications being performed. A bar (15A) is displayed a bottom end of the screen that illustrates an application that is being performed or that is performable. The controller 180 may cause the display unit 151 to display a preview screen that displays a state in which an application related to a proximately touched icon is performed, in a case where a particular icon among icons displayed on the bar (15A) is proximately touched.

FIG. 15(b) illustrates a preview screen being displayed on an entire area of the display unit 151, where the preview screen displays a state in which a particular application related to a proximately touched icon is being performed, and FIG. 15(c) illustrates a state of a particular application being performed on a portion of the display unit in a thumbnail format.

That is, the controller 180 may perform a preview function of an execution screen of particular application using a proximate touch during multi-tasking operation. Furthermore, in a case where the proximate touch is released, a preview screen of particular application disappears and is returned to an originally displayed screen.

Meanwhile, the controller 180 may convert the screen to an execution screen of the particular application, not the screen where the preview function is executed in response to a particular key signal input. For example, in a case where a predetermined area of the preview screen displaying a state of the particular application being executed is actually touched, conversion may be performed from the preview screen to an execution screen of the particular application. For example, in a case where a predetermined area of the preview screen displaying the particular application-executed state is actually touched, the conversion may be carried out from the preview screen to the execution screen of particular application.

Furthermore, the controller 180 may perform the conversion from the preview screen to the execution screen of particular application, in a case where a predetermined area of the preview screen displaying the particular application-executed state is actually touched. Furthermore, the controller 180 may perform, in order to prevent an erroneous operation, the preview function of particular application-executed screen, or may control to perform a preview screen-disappearing function, in a case where the proximate touch is detected for more than a predetermined time, or release of the proximate touch continues for more than a predetermined time. The predetermined time may be set up by a user or defaulted.

Meanwhile, albeit not being illustrated, the portable terminal 100 may simultaneously display at least two executed states among a plurality of applications by dividing a screen to a plurality of areas.

Figure 16:
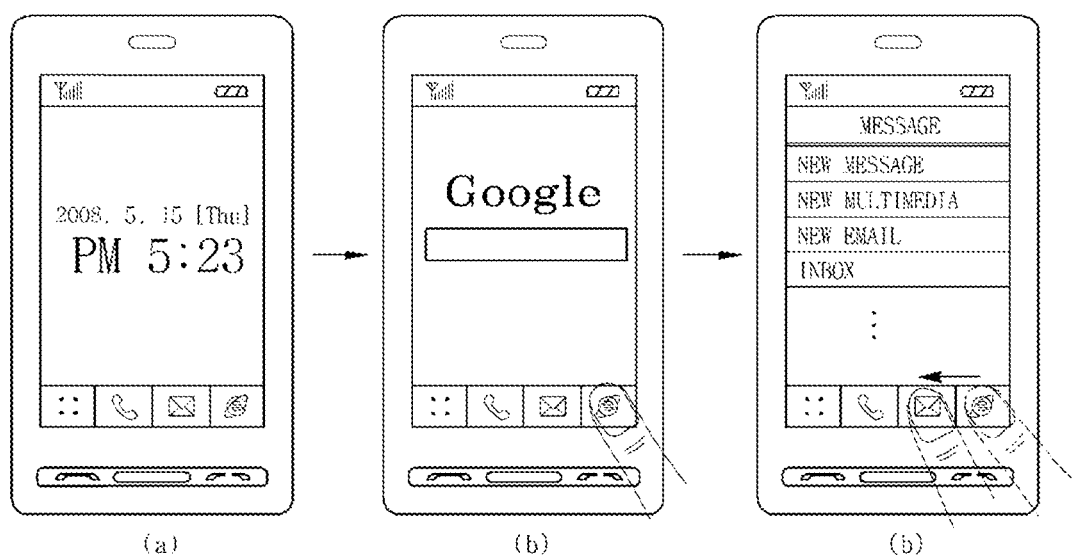

FIG. 16 is a schematic view illustrating an entry screen of a particular menu, in a case where an icon displaying the particular menu in a portable terminal is proximately touched.

FIG. 16 (*a*) illustrates a state in which a idle screen is displayed. An icon of a particular menu is displayed at a lower end of the screen. The menu displayed by an icon may be defaulted, or may be set up by a user. For example, a frequently used menu icon may be displayed at a lower end of the idle screen by a user set-up or default set-up.

The controller 180 may cause the display unit 151 to display a screen entered to a first menu, in a case where a first menu icon among the displayed icons is proximately touched. FIG. 16 (*b*) illustrates a displayed state of a screen that has entered a first menu. In this case, if the proximately touched point moves to a second menu icon, the controller 180 may cause the display unit 151 to convert to a screen that has entered the second menu {FIG. 16 (*c*)}. The controller 180 may perform a preview function of a particular menu entrance screen by using a proximity touch.

Meantime, in a case where the proximate touch is released, the preview screen that has entered a particular menu disappears, and is returned to an originally displayed screen. The controller 180 may convert to a particular menu-entered screen, not to a screen where the preview function is performed in response to input of a particular key signal. For example, in a case where a predetermined area of the preview screen is actually touched, conversion may be made from the preview screen to a particular menu-entered screen.

Furthermore, the controller 180 may cause the display unit 151 to display, in order to prevent an erroneous operation, the particular menu entered preview screen, or may control to perform a preview screen-disappearing function, in a case where the proximate touch is detected for more than a predetermined time, or release of the proximate touch continues for more than a predetermined time. The predetermined time may be set up by a user or defaulted.

Figure 17:
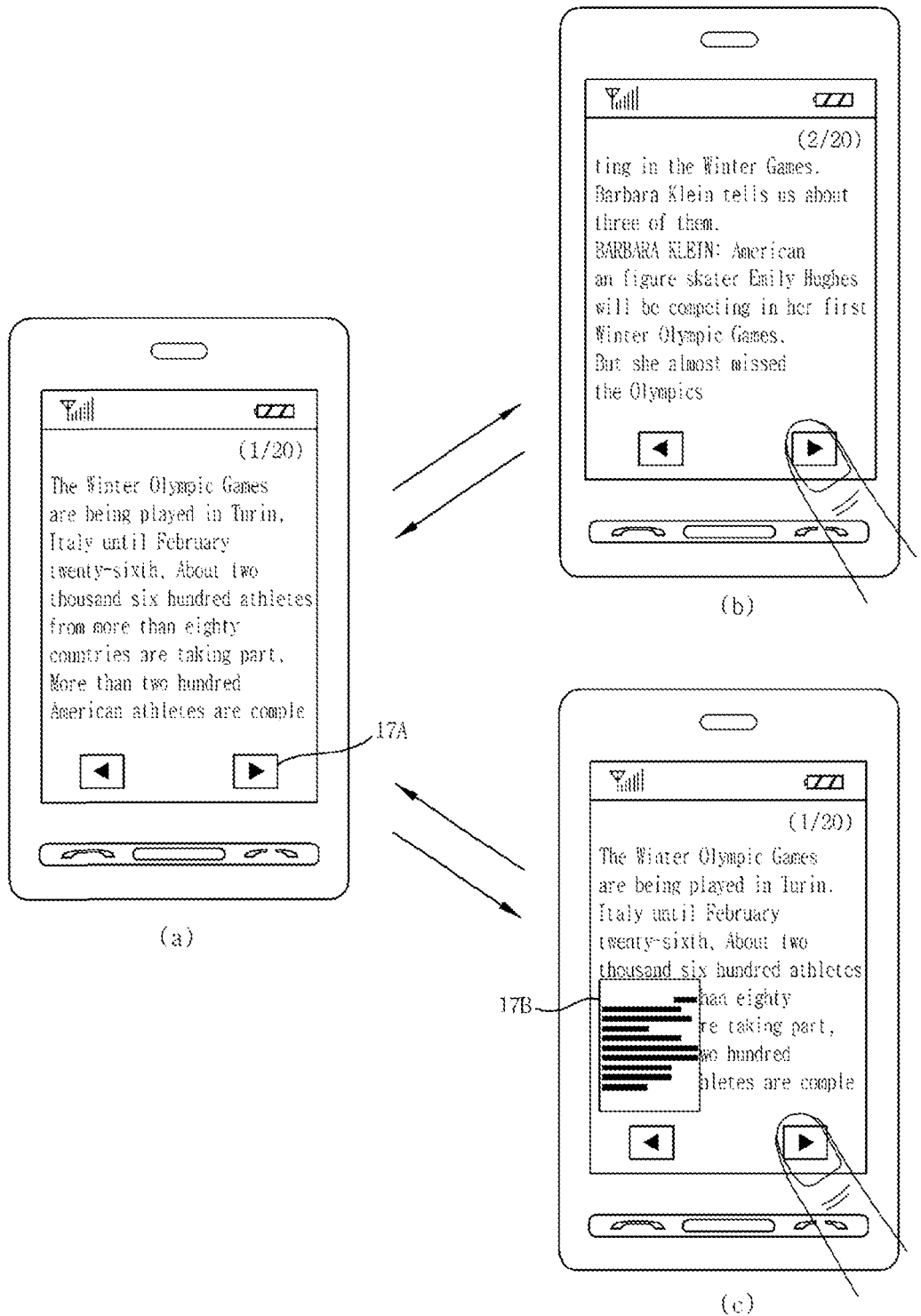

FIG. 17 is a schematic view illustrating a screen in advance where a scroll function is performed, in a case where a scroll icon is proximately touched, the term of scroll icon means an icon for moving a screen.

FIG. 17 (*a*) illustrates a state where a text message comprised of a plurality of pages is opened. A scroll icon (17A) configured to move the pages is displayed at a lower end of the screen. The controller 180 can perform a preview function of next page, in a case where an icon indicating movement to the next page in the scroll icon (17A) is proximately touched.

FIG. 17 (*b*) illustrates a state where a screen on which the preview function of next page is performed is displayed on an entire area of the display unit 151. FIG. 17 (*c*) illustrates a state where a screen, on which the preview function of next page is performed, is displayed on one area in thumbnail format (17B). That is, the controller 180 can perform a preview function of a page-moved screen by using the proximate touch of the scroll icon (17A). Furthermore, the preview function-performed screen disappears and returns to an originally displayed screen, in a case where the proximate touch is released.

Meanwhile, the controller 180 can convert to a page-move screen, not a screen where the preview function is performed in response to a particular key signal input. For example, in a case where a predetermined area of the preview screen is actually touched, conversion may be implemented from the preview screen to the page-moved screen.

Furthermore, the controller 180 may perform the preview function of the page-moved screen, or may control to perform a preview screen-disappearing function, in order to prevent an erroneous operation, in a case where the proximate touch is detected for more than a predetermined time, or release of the proximate touch continues for more than a predetermined time. The predetermined time may be set up by a user or defaulted.

The controller 180 may perform the preview function by moving the pages at a predetermined time interval, in a case where the proximate touch of the scroll icon (17A) is continued.

Figure 18:
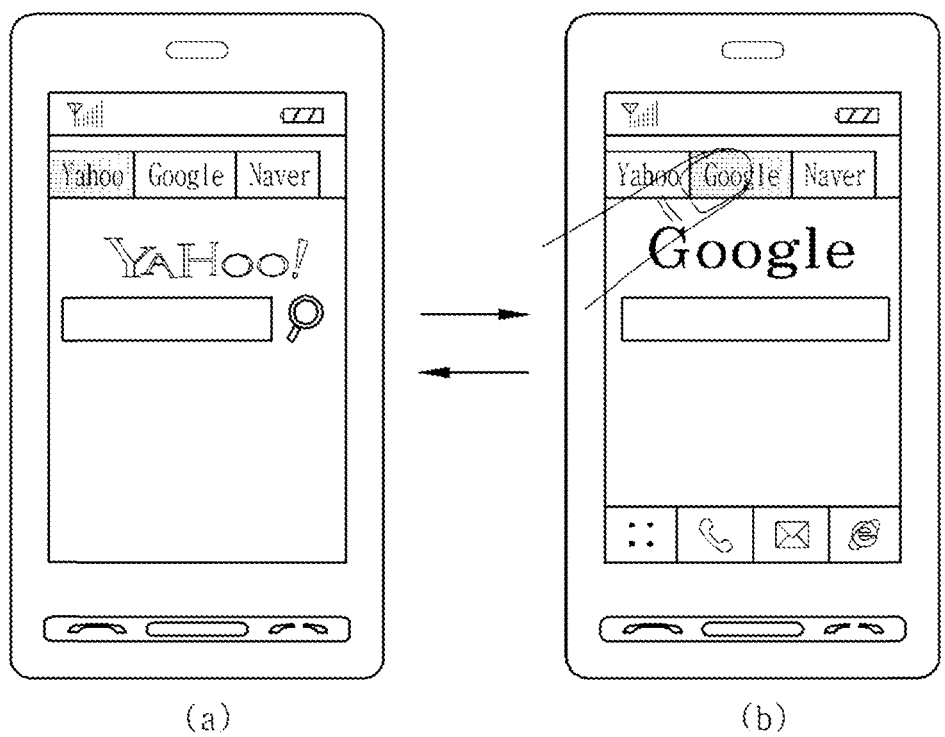

FIG. 18 is a schematic view illustrating in advance a screen of a particular webpage, in a case where an item of the particular webpage is proximately touched in a state where a plurality of webpage is connected.

FIG. 18 (*a*) illustrates a state where a first webpage is displayed in a state a plurality of webpage is connected. In order to illustrate the connected plurality of webpage, an item corresponding to a webpage connected in a tab format is displayed at an upper end of the screen.

The controller 180 may perform a preview function of a second webpage, in a case where an item corresponding to a second webpage among items displayed at the upper end of the screen is proximately touched. FIG. 18 (*b*) illustrates a state where a preview function-performed screen of the second webpage is displayed.

Furthermore, in a case where the proximate touch is released, the preview function-performed screen disappears and return is made to a screen illustrating the originally-displayed first webpage. Meanwhile, the controller 180 may convert to a second webpage-illustrated screen, not the screen where the preview function performed screen in response to a particular key signal input. For example, conversion to the second webpage screen may be implemented, in a case where a predetermined area of the preview screen is actually touched.

Furthermore, the controller 180 may perform the second webpage preview function, or may control to perform a preview screen-disappearing function, in order to prevent an erroneous operation, in a case where the proximate touch is detected for more than a predetermined time, or release of the proximate touch continues for more than a predetermined time. The predetermined time may be set up by a user or defaulted.

Meanwhile, portable terminal according to an exemplary embodiment of the present invention may perform a preview function of a screen applied with a particular function setting.

Figure 19:
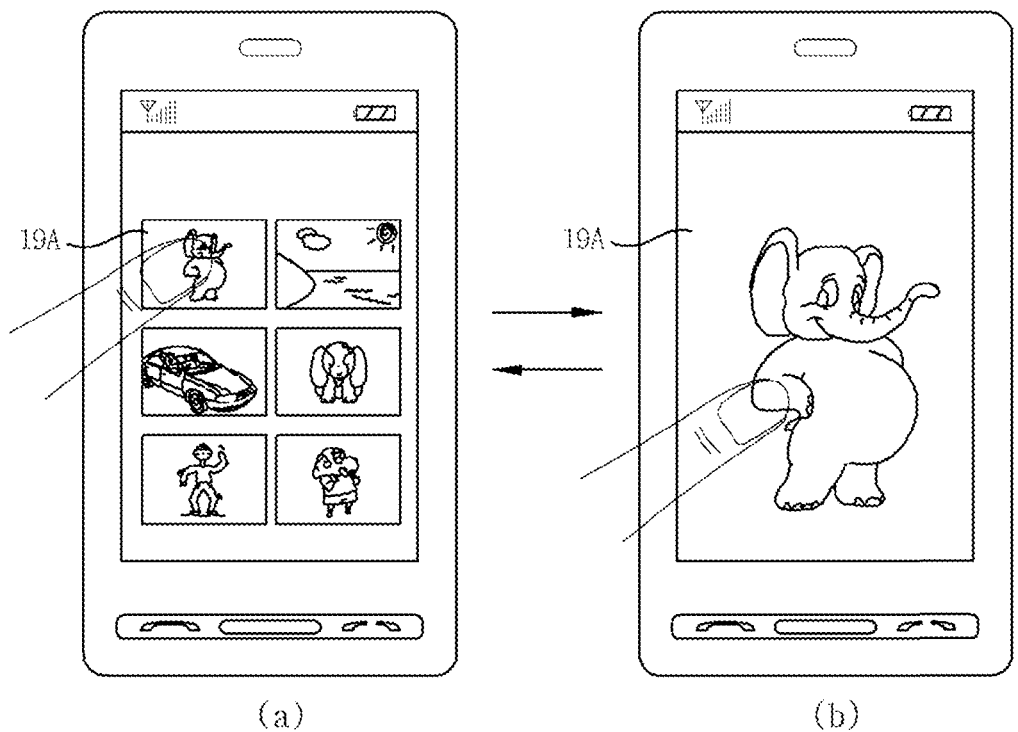

FIG. 19 is a schematic view illustrating a state where a preview function of wall paper is performed.

FIG. 19(a) illustrates a state where a plurality of images selectable as wall paper is displayed in a thumbnail format.

Referring to FIG. 19(b), in a case where a particular thumbnail (19A) among the plurality of thumbnails is proximately touched, the controller 180 may display in advance a screen where the particular thumbnail (19A) is applied as wall paper. Furthermore, the controller 180 may display in advance a screen where other wall paper is applied in response to movement to a proximately touched area.

Furthermore, in a case where the proximate touch is released, the preview function-performed screen disappears, and return is made to a screen where the originally displayed plurality of thumbnails is displayed. The controller 180 may set the particular thumbnail (19A) as wall paper in response to a particular key signal input. For example, in a case where a particular area of the preview screen is actually touched, the particular thumbnail (19A) may be set as wall paper.

Figure 20:
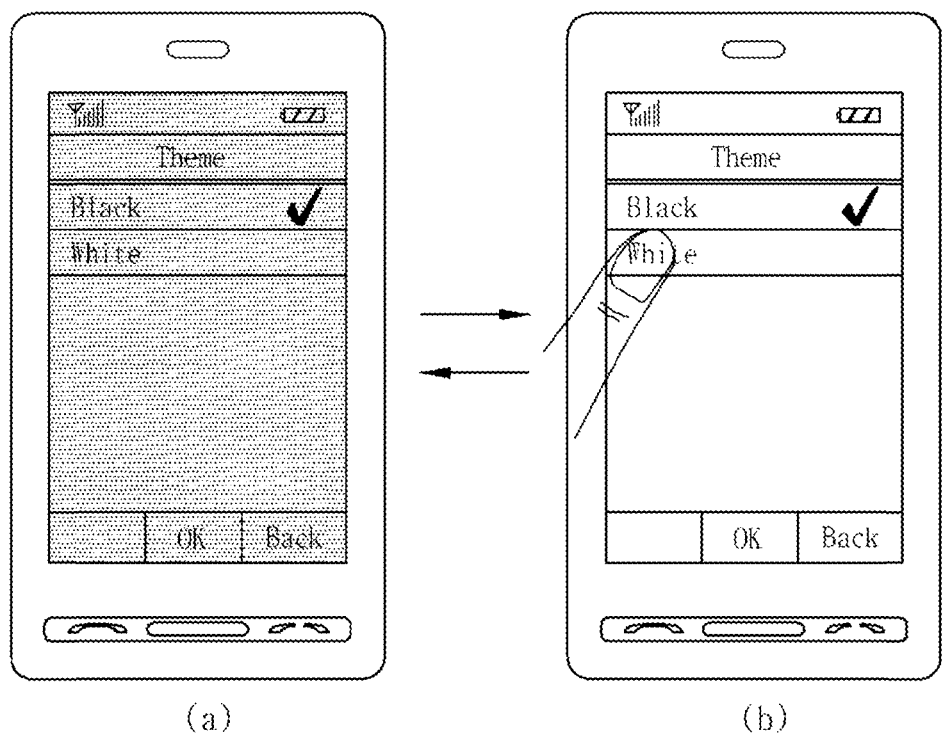

FIG. 20 is a schematic view illustrating a state where a preview function of a wall paper theme is implemented. The term of "wall paper theme" means a particular format decorated on a screen.

FIG. 20(a) is a schematic view illustrating a state where a selectable plurality of wall paper themes is displayed in a list. FIG. 20(a) illustrates a screen where a first theme is applied. In a case where a second theme is proximately touched among the plurality of wall paper themes, the controller 180 may cause the display unit 151 to display in advance a screen where the second theme is applied. Furthermore, in a case where a proximate touch is released, the preview function-performed screen disappears, and return is made to a screen where an originally displayed first theme is applied. Meanwhile, the controller 180 may set the wall paper theme as a second theme, in a case where the second theme is actually proximately touched.

Figure 21:
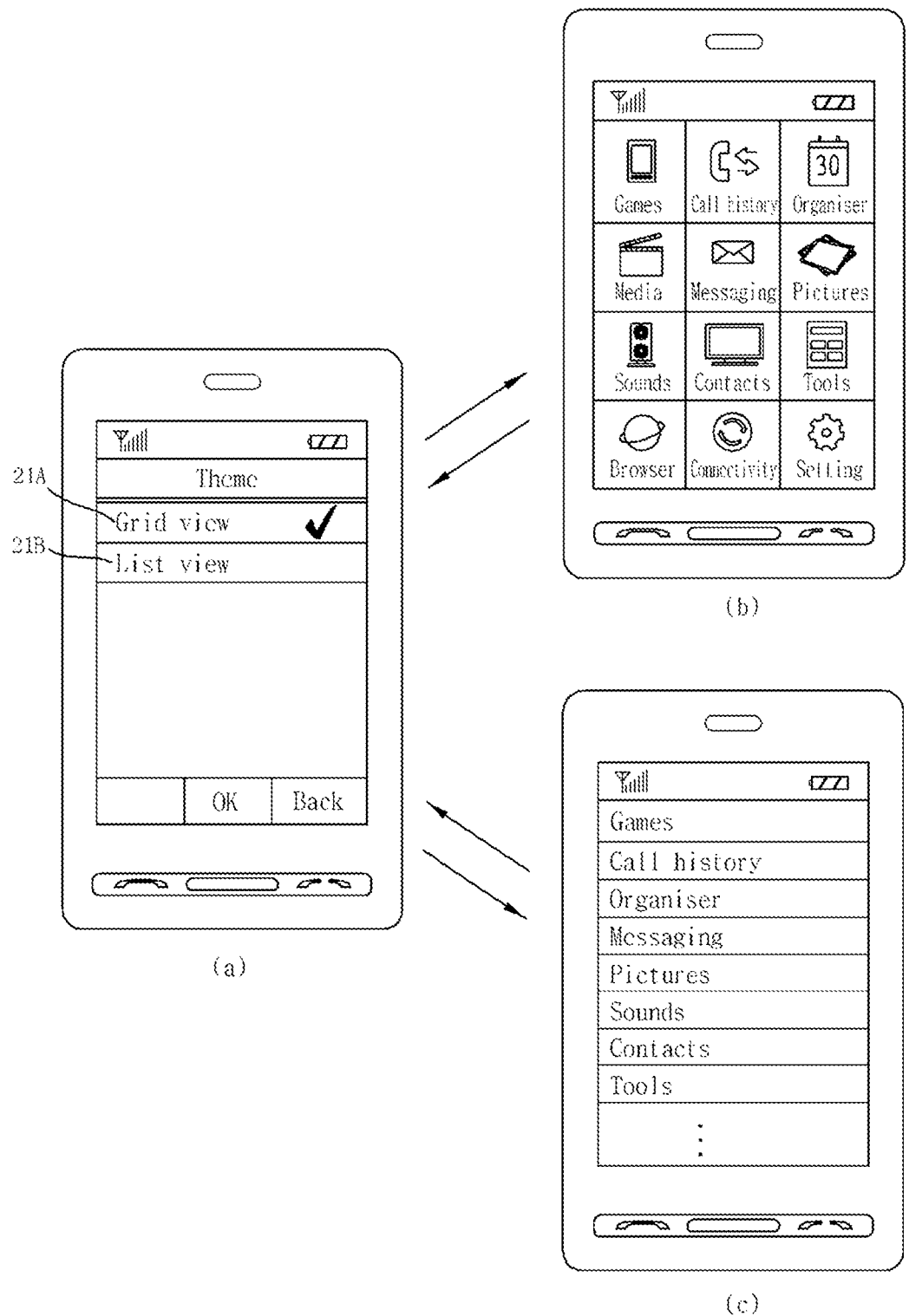

FIG. 21 is a schematic view illustrating a state where a preview function of menu style-applied screen is implemented. The term of "menu style" means a particular shape displaying a menu.

FIG. 21(a) illustrates a state where a selectable plurality of menu styles is displayed. In a case where a grid view among the menu styles is proximately touched, the controller 180 may display in advance a screen where the grid view (21A) is applied as shown in FIG. 21(b). Furthermore, in a case where a list menu style (list view) among the menu styles is proximately touched, the controller 180 may display in advance a screen where the list view (21B) is applied as shown in FIG. 21(c).

Furthermore, in a case where a proximate touch is released, the preview function-performed screen disappears, and return is made to an originally displayed screen of FIG. 21(a). Meanwhile, in a case where a particular menu style is actually touched, the controller 180 may set to a menu style where the particular menu style is displayed.

Figure 22:
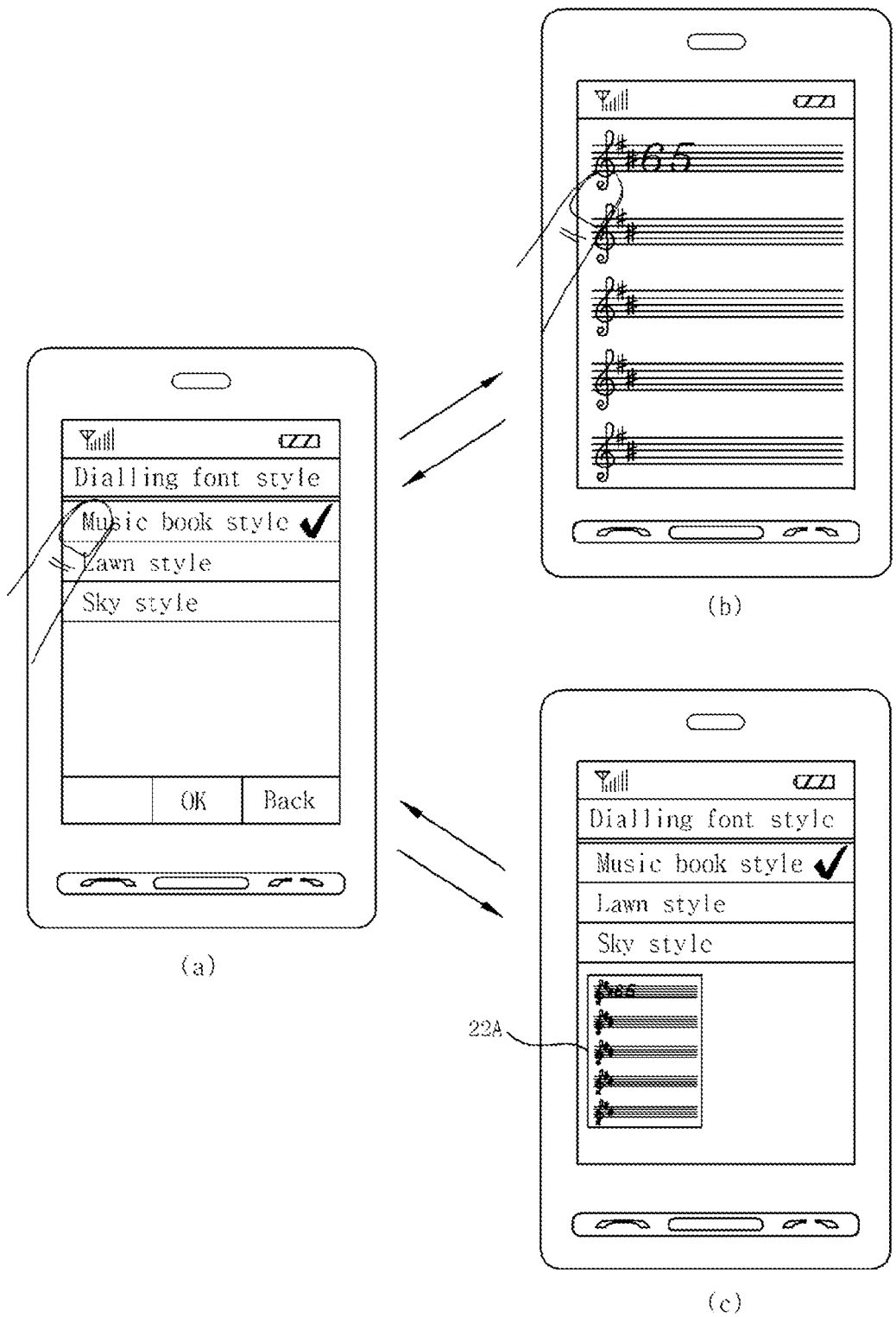

FIG. 22 is a schematic view illustrating a state where a preview function of a screen, where a displayed particular font is applied, is displayed. The term of "font" means a set where sizes and typefaces are same in a displayed character. Thus, displayed character styles may differ depending on which font is applied.

FIG. 22(a) illustrates a state where selectable plurality of fonts is displayed. In a case where a first font is proximately touched among the plurality of fonts, the controller 180 may display in advance a screen where the first font is applied.

FIG. 22(b) illustrates a state where the first font-applied preview screen is displayed on an entire area of the display unit 151. FIG. 22(c) illustrates a state where the first font-applied preview screen is displayed on a partial area of the display unit 151 in a thumbnail format. That is, the controller 180 can cause the display unit 151 to display in advance a screen where a particular font is proximately touched.

Furthermore, in a case the proximate touch is released, the preview function-performed screen disappears, and return is made to an originally displayed screen of FIG. 22 (a).

Meantime, in a case where a particular font is actually touched, the controller 180 may set to a font of a character where the particular font is displayed.

The foregoing portable terminal capable of sensing proximity touch and a method for controlling a screen in the same is not to be construed as limiting of the present disclosure as they are intended merely as illustrative of particular implementations of the invention as enabled herein. It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A portable terminal for sensing a touch input comprising a direct touch input and a proximity touch input, the terminal comprising:
    a touch screen configured to display at least a first portion of a page and to receive the proximity touch input via a touching object; and
    a controller configured to recognize the proximity touch input when the touching object is located within a threshold distance relative to the touch screen for a threshold period of time,
    wherein:
    a size of the displayed page is changed from a first size to a second size in response to the proximity touch input; and
    the touch screen displays at least one control window in response to the proximity touch input, the at least one control window being configured to receive a control input for at least one of:
        changing the size of the displayed page;
        or
        turning the displayed page from a current page to a next or previous page,
    wherein the control input is received when the touching object is located within the threshold distance,
    wherein the at least one control window includes a scroll box indicating a portion of the page currently displayed on the touch screen, and the scroll box is configured to move in a direction of movement of the touching object relative to the touch screen, and
    wherein the second size of the displayed page is adjustable according to a distance between the touching object and the touch screen while the touching object is located within the threshold distance, and the second size of the displayed page is displayed while the touching object is located within the threshold distance and the first size of the displayed page is redisplayed when the touching object is no longer located within the threshold distance relative to the touch screen.

2. The terminal of claim 1, wherein the page comprises a web page or a page of a document.

3. The terminal of claim 1, wherein:
    the second size of the displayed page is increasingly magnified as the distance between the touching object and the touch screen decreases; and a portion of the page that is magnified substantially corresponds to a position on the touch screen to which the proximity touch input is received.

4. The terminal of claim 1, wherein the size of the displayed page is changed from the first size to the second size in response to the control input and the size of the displayed page returns to the first size when the touching object is no longer located within the threshold distance relative to the touch screen.

5. The terminal of claim 1, wherein the displayed page is turned to the next or previous page in response to the control input and returns to the current page when the touching object is no longer located within the threshold distance relative to the touch screen.

6. The terminal of claim 1, wherein the controller is further configured to:
recognize the direct touch input received at the at least one control window and controls the touch screen to display a second portion of the page corresponding to a position of the scroll box such that the second portion of the page remains to be displayed when the touching object no longer contacts the touch screen.

7. The terminal of claim 1, wherein at least a portion of the at least one control window is displayed near a position on the touch screen to which the proximity touch input is received.

8. A method for controlling display of a page in a portable terminal having a touch screen capable of sensing a touch input comprising a direct touch input and a proximity touch input, the method comprising:
displaying at least a first portion of the page;
receiving the proximity touch input at the touch screen via a touching object, the proximity touch input recognized when the touching object is located within a threshold distance relative to the touch screen for a threshold period of time;
changing a size of the displayed page from a first size to a second size in response to the proximity touch input; and
redisplaying the first size of the displayed page when the touching object is no longer located within the threshold distance relative to the touch screen,
wherein the touch screen displays at least one control window in response to the proximity touch input, the at least one control window being configured to receive a control input for at least one of:
changing the size of the displayed page;
or
turning the displayed page from a current page to a next or previous page,
wherein the control input is received when the touching object is located within the threshold distance,
wherein the at least one control window includes a scroll box indicating a portion of the page currently displayed on the touch screen, and the scroll box is configured to move in a direction of movement of the touching object relative to the touch screening, and
wherein the second size of the displayed page, which is displayed while the touching object is located within the threshold distance, is adjustable according to a relative distance between the touching object and the touch screen while the touching object is located within the threshold distance.

9. The method of claim 8, wherein the page comprises a web page or a page of a document.

10. The method of claim 8, wherein:
the second size of the displayed page is increasingly magnified as the distance between the touching object and the touch screen decreases; and a portion of the page that is magnified substantially corresponds to a position on the touch screen to which the proximity touch input is received.

11. The method of claim 8, wherein the size of the displayed page is changed from the first size to the second size in response to the control input and the size of the displayed page returns to the first size when the touching object is no longer located within the threshold distance relative to the touch screen.

12. A method for controlling display in a mobile terminal, the method comprising:
displaying a first object on a touchscreen of the mobile terminal, the first object including at least one first sub-object;
receiving a first proximity touch input over the first object by a touch medium for a prescribed time; and
displaying at least one preview image corresponding to the at least one first sub-object on the touchscreen while the touch medium maintains the first proximity touch input, the at least one preview image comprising a first preview image and a second preview image,
wherein the at least one preview image is displayed on an area adjacent to the first object while the first object is displayed, and
wherein the at least one preview image is displayed by moving at a predetermined time interval to be previewed such that the first preview image is changed to the second preview image according to the predetermined time interval.

13. The method of claim 12, wherein the at least one preview image is displayed such that the at least one preview image overlaps the first object on the touchscreen.

14. The method of claim 12, further comprising:
receiving a second proximity touch input over a second object on the touchscreen, the touch medium being moved from the first object to the second object while maintaining a distance from the touchscreen, the second object including at least one second sub-object; and
displaying at least one preview image corresponding to the at least one second sub-object on the touchscreen while the touch medium maintains the second proximity touch input.

15. The method of claim 13, wherein each of the first object and the second object includes an icon corresponding to a prescribed web-page, and each of the first sub-object and the second sub-object includes a browser to the prescribed web-page.

16. The method of claim 12, further comprising:
receiving a first touch input on one of the at least one preview image; and
displaying the first sub-object whose preview image receives the first touch input on the touchscreen.

17. The method of claim 16, wherein the first sub-object whose preview image receives the first touch input is displayed on an entire area of the touchscreen.

18. The method of claim 12, further comprising:
recognizing that the first proximity touch input is being released; and
terminating display of the at least one preview image corresponding to the at least one first sub-object.

19. The method of claim 12, further comprising:
receiving a second touch input on one of the at least one preview image which receives a third proximity touch input; and
displaying the first sub-object whose preview image receives the second touch input as a wallpaper on the touchscreen.

20. The method of claim 12, wherein the first object includes an image folder and the first sub-object includes an image in the image folder.

21. A method for controlling display in a mobile terminal, the method comprising:
   displaying a plurality of icons on a touchscreen of the mobile terminal, the plurality of icons being displayed such that the plurality of icons overlaps one another;
   receiving a proximity touch input over the icon for a prescribed time by a touch medium;
   displaying a first portion of the plurality of icons for a predetermined time on the touchscreen while the touch medium maintains the proximity touch input; and
   displaying a second portion of the plurality of icons for the predetermined time on the touchscreen after displaying the first portion of the plurality of icons,
   wherein the first portion and the second portion of the plurality of icons are displayed by moving at a predetermined time interval to be previewed such that the second portion is displayed according to the predetermined time interval following the displaying of the first portion, and
   wherein the first portion and the second portion of the plurality of icons are displayed on an area where the overlapped plurality of icons is displayed.

22. The method of claim 21, further comprising:
   receiving a touch input by the touch medium on the area where the overlapped plurality of icons is displayed; and
   displaying the plurality of icons on a portion of the touchscreen.

23. A mobile terminal comprising:
   a touchscreen configured to display a first object including at least one first sub-object; and
   a controller configured to:
      recognize a first proximity touch input received over the first object by a touch medium for a prescribed time;
      control the touchscreen to display at least one preview image corresponding to the at least one first sub-object while the touch medium maintains the first proximity touch input, the at least one preview image comprising a first preview image and a second preview image; and
      control the touchscreen to display the at least one preview image by moving at a predetermined time interval to be previewed such that the first preview image is changed to the second preview image according to the predetermined time interval,
   wherein the at least one preview image is displayed on an area adjacent to the first object while the first object is displayed.

24. The mobile terminal of claim 23, wherein the controller is further configured to control the touchscreen to display such that the at least one preview image overlaps the first object.

25. The mobile terminal of claim 23, wherein the controller is further configured to:
   recognize a second proximity touch input received over a second object on the touchscreen, the touch medium being moved from the first object to the second object while maintaining a distance from the touchscreen, the second object including at least one second sub-object; and
   control the touchscreen to display at least one preview image corresponding to the at least one second sub-object while the touch medium maintains the second proximity touch input.

26. The mobile terminal of claim 25, wherein each of the first object and the second object includes an icon corresponding to a prescribed web-page, and each of the first sub-object and the second sub-object includes a browser to the prescribed web-page.

27. The mobile terminal of claim 23, wherein the controller is further configured to:
   recognize a first touch input received on one of the at least one preview image; and
   control the touchscreen to display the first sub-object whose preview image receives the first touch input.

28. The mobile terminal of claim 27, wherein the controller is further configured to control the touchscreen to display the first sub-object whose preview image receives the touch input on an entire area of the touchscreen.

29. The mobile terminal of claim 23, wherein the controller is further configured to:
   recognize that the first proximity touch input is being released; and
   control the touchscreen to terminate display of the at least one preview image corresponding to the at least one first sub-object.

30. The mobile terminal of claim 23, wherein the controller is further configured to:
   recognize a second touch input received on one of the at least one preview image which receives a third proximity touch input; and
   control the touchscreen to display the first sub-object whose preview image receives the second touch input as a wallpaper.

31. The mobile terminal of claim 23, wherein the first object includes an image folder and the first sub-object includes an image in the image folder.

32. A mobile terminal comprising:
   a touchscreen configured to display a plurality of icons overlapping one another; and
   a controller configured to:
      recognize a proximity touch input received over the icon folder for a prescribed time by a touch medium;
      control the touchscreen to display a first portion of the plurality of icons for a predetermined time on the touchscreen while the touch medium maintains the proximity touch input; and
      control the touchscreen to display a second portion of the plurality of icons for the predetermined time on the touchscreen after displaying the first portion of the plurality of icons,
   wherein the first portion and the second portion of the plurality of icons are displayed by moving at a predetermined time interval to be previewed such that the second portion is displayed according to the predetermined time interval following the displaying of the first portion, and
   wherein the first portion and the second portion of the plurality of icons are displayed on an area of the touchscreen where the overlapped plurality of icons is displayed.

33. The mobile terminal of claim 32, wherein the controller is further configured to:
   recognize a touch input by the touch medium on the area where the overlapped plurality of icons is displayed; and
   control the touchscreen to display the plurality of icons on a portion of the touchscreen.

* * * * *